United States Patent
Le Jouan

(10) Patent No.: US 12,495,018 B2
(45) Date of Patent: Dec. 9, 2025

(54) MANAGING DATA ON COMPUTER AND TELECOMMUNICATIONS NETWORKS

(71) Applicant: Privowny, Inc., Atlanta, GA (US)

(72) Inventor: Herve Le Jouan, Saint-Marc Jaumegarde (FR)

(73) Assignee: Privowny, Inc., Atlanta, GA (US)

( * ) Notice: Subject to any disclaimer, the term of this patent is extended or adjusted under 35 U.S.C. 154(b) by 363 days.

(21) Appl. No.: 18/123,537

(22) Filed: Mar. 20, 2023

(65) Prior Publication Data

US 2023/0300098 A1   Sep. 21, 2023

Related U.S. Application Data

(63) Continuation of application No. 17/829,136, filed on May 31, 2022, now Pat. No. 11,611,526, which is a continuation of application No. 16/927,709, filed on Jul. 13, 2020, now Pat. No. 11,349,799, which is a continuation of application No. 16/712,770, filed on Dec. 12, 2019, now Pat. No. 10,735,368, which is a continuation of application No. 16/667,679, filed on Oct. 29, 2019, now Pat. No. 10,715,476, which is a continuation of application No. 16/105,907, filed on Aug. 20, 2018, now Pat. No. 10,469,434, which is a continuation of application No. 16/052,352, filed on Aug. 1, 2018, now Pat. No. 10,469,433, which is a continuation of application No. 15/641,093, filed on Jul. 3, 2017, now Pat. No. 10,044,665, which is a continuation of application No. 14/948,207, filed on (Continued)

(51) Int. Cl.
| | | |
|---|---|---|
| H04L 51/48 | (2022.01) | |
| G06F 21/62 | (2013.01) | |
| H04L 9/40 | (2022.01) | |
| H04L 67/02 | (2022.01) | |
| H04L 67/306 | (2022.01) | |
| H04L 67/53 | (2022.01) | |

(52) U.S. Cl.
CPC .......... *H04L 51/48* (2022.05); *G06F 21/6245* (2013.01); *H04L 63/0407* (2013.01); *H04L 63/06* (2013.01); *H04L 67/02* (2013.01); *H04L 67/306* (2013.01); *H04L 67/53* (2022.05)

(58) Field of Classification Search
CPC ....... H04L 67/53; H04L 63/0407; H04L 9/00; H04L 51/48; H04L 63/06; H04L 9/08; H04L 67/02; H04L 67/306; G06F 21/6245

See application file for complete search history.

(56) References Cited

U.S. PATENT DOCUMENTS

| | | |
|---|---|---|
| 5,987,508 A | 11/1999 | Agraharam et al. |
| 6,161,129 A | 12/2000 | Rochkind |

(Continued)

FOREIGN PATENT DOCUMENTS

WO   2005/048544 A1   5/2005

OTHER PUBLICATIONS

U.S. Appl. No. 17/829,136, filed May 31, 2022, U.S. Pat. No. 11,611,526, Issued.

(Continued)

*Primary Examiner* — Frantz B Jean
(74) *Attorney, Agent, or Firm* — Alston & Bird LLP

(57) ABSTRACT

Protecting personal information by generating entity-specific aliases for use in communication with third parties is disclosed.

20 Claims, 13 Drawing Sheets

Related U.S. Application Data

Nov. 20, 2015, now Pat. No. 9,699,133, which is a continuation of application No. 13/873,029, filed on Apr. 29, 2013, now abandoned, said application No. 16/667,679 is a continuation-in-part of application No. 14/828,376, filed on Aug. 17, 2015, now Pat. No. 10,621,377, which is a continuation of application No. 12/900,239, filed on Oct. 7, 2010, now abandoned.

(60) Provisional application No. 61/639,788, filed on Apr. 27, 2012, provisional application No. 61/349,784, filed on May 28, 2010.

(56) References Cited

U.S. PATENT DOCUMENTS

| | | | |
|---|---|---|---|
| 7,216,227 | B2 | 5/2007 | Grynberg |
| 7,237,010 | B2 | 6/2007 | Mora |
| 7,546,349 | B1 | 6/2009 | Cooley |
| 7,783,741 | B2 | 8/2010 | Hardt |
| 8,413,251 | B1 | 4/2013 | Gibney et al. |
| 10,686,757 | B2 | 6/2020 | Mcisaac et al. |
| 2002/0019764 | A1 | 2/2002 | Mascarenhas |
| 2002/0087641 | A1 | 7/2002 | Levosky |
| 2002/0120748 | A1 | 8/2002 | Schiavone et al. |
| 2003/0233329 | A1 | 12/2003 | Laraki et al. |
| 2004/0024823 | A1 | 2/2004 | Del Monte |
| 2005/0010780 | A1 | 1/2005 | Kane et al. |
| 2005/0114453 | A1* | 5/2005 | Hardt .................. H04L 51/212 709/206 |
| 2005/0201536 | A1 | 9/2005 | LaLonde et al. |
| 2005/0204011 | A1 | 9/2005 | Velayudham |
| 2005/0246420 | A1 | 11/2005 | Little, II |
| 2006/0274896 | A1* | 12/2006 | Livesay ............. G06Q 30/0603 380/255 |
| 2007/0011245 | A1 | 1/2007 | Kawashima et al. |
| 2007/0180039 | A1 | 8/2007 | Sutidze et al. |
| 2007/0250704 | A1 | 10/2007 | Hallam-Baker |
| 2008/0022414 | A1 | 1/2008 | Cahn et al. |
| 2008/0176538 | A1 | 7/2008 | Terrill et al. |
| 2008/0208981 | A1 | 8/2008 | Goldberg et al. |
| 2009/0124270 | A1 | 5/2009 | Kelley |
| 2009/0259725 | A1 | 10/2009 | Rabinovich |
| 2010/0037046 | A1 | 2/2010 | Ferg et al. |
| 2010/0057866 | A1 | 3/2010 | Bauchot et al. |
| 2010/0077053 | A1 | 3/2010 | Haffner |
| 2010/0105454 | A1* | 4/2010 | Weber .................. H04L 67/53 463/1 |
| 2010/0325691 | A1 | 12/2010 | Willars et al. |
| 2011/0258686 | A1 | 10/2011 | Raj et al. |
| 2011/0289011 | A1 | 11/2011 | Hull et al. |
| 2012/0036360 | A1* | 2/2012 | Bassu .................. H04L 9/3228 713/168 |
| 2013/0191460 | A1 | 7/2013 | Caldwell et al. |
| 2013/0262392 | A1 | 10/2013 | Vibhor et al. |
| 2014/0047043 | A1 | 2/2014 | Esfahani et al. |

OTHER PUBLICATIONS

U.S. Appl. No. 16/927,709, filed Jul. 13, 2020, U.S. Pat. No. 11,349,799, Issued.
U.S. Appl. No. 16/712,770, filed Dec. 12, 2019, U.S. Pat. No. 10,735,368, Issued.
U.S. Appl. No. 16/667,679, filed Oct. 29, 2019, U.S. Pat. No. 10,715,476, Issued.
U.S. Appl. No. 16/105,907, filed Aug. 20, 2018, U.S. Pat. No. 10,469,434, Issued.
U.S. Appl. No. 16/052,352, filed Aug. 1, 2018, U.S. Pat. No. 10,469,433, Issued.
U.S. Appl. No. 15/641,093, filed Jul. 3, 2017, U.S. Pat. No. 10,044,665, Issued.
U.S. Appl. No. 14/948,207, filed Nov. 20, 2015, U.S. Pat. No. 9,699,133, Issued.
U.S. Appl. No. 13/873,029, filed Apr. 29, 2013, 2013/0318199, Abandoned.
U.S. Appl. No. 14/828,376, filed Aug. 17, 2015, U.S. Pat. No. 10,621,377, Issued.
U.S. Appl. No. 12/900,239, filed Oct. 7, 2010, 2011/0295988, Abandoned.
Extended European Search Report Mailed on Oct. 2, 2023 for EP Application No. 23156660, 10 page(s).
European Patent Application No. 11787449.5, Examination Report dated Feb. 8, 2018.
European Patent Application No. 11787449.5, Search Report mailed Dec. 17, 2014.
European Patent Application No. 13781303.6, Search Report mailed Jan. 18, 2016.
http://ec.europa.eu/justice_home/news/consulting_public/news_consulting_0005_en.htm, Jul. 26, 2010.
http:www.ipc.on.ca/english/Home-Page/, Sep. 27, 2010.
International Application No. PCT/US2011/038214, International Search Report and Written Opinion dated Aug. 24, 2011.
International Application No. PCT/US2013/038677, International Search Report and Written Opinion mailed Oct. 18, 2013.
IPEA/409—International Preliminary Report on Patentability Mailed on Dec. 13, 2012 for WO Application No. PCT/US11/038214, 7 page(s).
IPEA/409—International Preliminary Report on Patentability Mailed on Nov. 6, 2014 for WO Application No. PCT/US13/038677, 8 page(s).
ISA/220—Notification of Transmittal or Search Report and Written Opinion of the ISA, or the Declaration Mailed on Aug. 24, 2011 for WO Application No. PCT/US11/038214, 1 page(s).
ISA/220—Notification of Transmittal or Search Report and Written Opinion of the ISA, or the Declaration Mailed on Oct. 18, 2013 for WO Application No. PCT/US13/038677, 1 page(s).
Network Advertising Initiative, webpages located at www.networkadvertising.org, Sep. 30-Oct. 5, 2010.
OpenSocial and Gadgets Specification Group, "OpenSocial Specification v0.9," Apr. 2009 [retrieved online at http:/opensocial-resources.googlecode.com/svn/spec/0.9/OpenSocial-Specification.xml on Jan. 13, 2012].
OpenSocial Specification v0.9, http://opensocial-resources.googlecode.com/svn/spec/0.9/OpenSocial-Specification.xml, Apr. 2009.
Outgoing—ISA/210—International Search Report and Written Opinion Mailed on Aug. 24, 2011 for WO Application No. PCT/US11/038214, 7 page(s).
Outgoing—ISA/210—International Search Report and Written Opinion Mailed on Oct. 18, 2013 for WO Application No. PCT/US13/038677, 8 page(s).
Search Report and Written Opinion dated Aug. 24, 2011 from International Serial No. PCT/US2011/038214 filed May 26, 2011.
Search Report and Written Opinion mailed Aug. 24, 2011 from International Serial No. PCT/US2011/038214 filed May 26, 2011.
www.networkadvertising.org, Oct. 5, 2010.
www.truste.com, Sep. 26, 2010.

* cited by examiner

MANAGING DATA ON COMPUTER AND TELECOMMUNICATIONS NETWORKS

CROSS-REFERENCE TO RELATED APPLICATIONS

This application is a continuation of U.S. patent application Ser. No. 17/829,136, filed May 31, 2022 and entitled "Managing Data on Computer and Telecommunications Networks," which is a continuation of U.S. patent application Ser. No. 16/927,709, filed Jul. 13, 2020 and entitled "Managing Data on Computer and Telecommunications Networks," now U.S. Pat. No. 11,349,799, which is a continuation of U.S. patent application Ser. No. 16/712,770, filed Dec. 12, 2019 and entitled "Managing Data on Computer and Telecommunications Networks," now U.S. Pat. No. 10,735,368, which is a U.S. patent application Ser. No. 16/667,679, filed Oct. 29, 2019 and entitled "Managing Data on Computer and Telecommunications Networks," now U.S. Pat. No. 10,715,476, which is a continuation of U.S. patent application Ser. No. 16/105,907, filed Aug. 20, 2018 and entitled "Managing Data on Computer and Telecommunications Networks," now U.S. Pat. No. 10,469,434, which is a continuation of U.S. patent application Ser. No. 16/052,352, filed Aug. 1, 2018 and entitled "Managing Data on Computer and Telecommunications Networks," now U.S. Pat. No. 10,469,433, which is a continuation of U.S. patent application Ser. No. 15/641,093, filed Jul. 3, 2017 and entitled "Managing Data on Computer and Telecommunications Networks," now U.S. Pat. No. 10,044,665, which is a continuation of U.S. patent application Ser. No. 14/948,207, filed Nov. 20, 2015 and entitled "Managing Data on Computer and Telecommunications Networks," now U.S. Pat. No. 9,699,133, which is a continuation of U.S. patent application Ser. No. 13/873,029, filed Apr. 29, 2013 and entitled "Managing Data on Computer and Telecommunications Networks,", which claims priority to U.S. Provisional Patent Application Ser. No. 61/639,788, filed Apr. 27, 2012 and entitled "Managing Data on Computer and Telecommunications Networks," which are incorporated herein by reference. This application is also a continuation-in-part of U.S. patent application Ser. No. 14/828,376, filed Aug. 17, 2015 and entitled "Managing Data on Computer and Telecommunications Networks," now U.S. Pat. No. 10,621,377, which is a continuation of U.S. patent application Ser. No. 12/900,239, filed Oct. 7, 2010 and entitled "Managing Data on Computer and Telecommunications Networks,", which claims the benefit of U.S. Provisional Patent Application Ser. No. 61/349,784, filed May 28, 2010 and entitled "System and Method for Data Management."

BACKGROUND

There are more than 1 billion Internet users worldwide, more than 3.5 billion mobile subscribers of which over 70% use their mobile phones for purposes other than voice, and all have at least once communicated personal data (whether email, name, date of birth, address, phone number, etc. . . . ) to companies (Service Providers, eCommerce sites, Banks, Mobile Operators, . . . ) and/or authorized, with or without their knowledge, the use of these data.

The services offered on Internet/mobile requiring authentication are becoming more and more numerous and varied (email, social networking sites, online shopping, auctions, banks, brands, etc. . . . ). Individuals often provide personal information without ever reading the usage contract associated with its use; receive email or SMS from those companies or other companies to which they have never communicated their personal data; are often in the middle, without their consent or without being fully aware, of multiple cross databases concerning their personal data and/or behavior allowing a better targeting; and sometimes use several email addresses to prevent "pollution/spam" but also multiple passwords which gradually leads to confusion but does not necessarily adequately respond to the challenges of visibility and transparency.

In addition, other systems such as Cookies, can be installed without individuals being really aware, which can collect personal information about the individuals.

One or more of these factors can mean that individuals cannot control having made available their personal data; they can forget their login and/or password; they are no longer in control of their own data; and, by the technical level of the terminologies commonly used, have only a vague idea of what is really going on, including fusion (crossing) of personal data files, analysis of their Internet behavior, and sharing of their personal data between companies. National and/or International authorities, among them, fall into this game with a desire to protect the individual, which is laudable, but can result in restrictions often not understood by individuals, not broadly applicable while the Internet is global, and which could have a negative impact on a booming eco system (Internet and Mobile).

The protection of privacy is a global issue that worries both individuals and the authorities. For example, the media coverage on the subject is increasing significantly, driven by Google and Facebook cases. This privacy concern is weighed in light of the value added services that a user is getting. Internet and Mobile phones offer lots of opportunities, some of which are unused or unusable at the moment, to meet the needs of individuals and thus provide the service(s) they want, provided that the relationship between the supplier and the individual is transparent and well understood. However, if nothing is done to make sure that individuals are informed and confident, then the Internet and more certainly the Mobile may not deliver all their promises and instead could be viewed as invaders of privacy and therefore individual freedom.

Today, in this context where the Internet and mobile phone multiply the opportunities to connect and where the engagement becomes a key element of the relationship between Individuals and Brands, the individual may want to be the center and especially the master, with full responsibility, whatever the means.

There are quite a few initiatives which have taken place in terms of protecting privacy, started by Governments and Authorities which have and are still very active in putting in place Laws, Regulations and rules in order to guarantee the Consumer and his personal data. Also, organizations such as Network Advertising Initiative (www.networkadvertising.org) or Truste (www.truste.com) have put in place some mechanisms either to be able to inform the consumer either to help companies to setup the right Privacy policies corresponding to the consumer's interest. However, those initiatives, even they are going into the right direction, didn't prevent privacy concerns from emerging significantly over years as they are primarily company-focused rather than consumer-focused.

FTC, EU Commission, ICO in the UK, German Federal Data protection Act, CNIL in France, AEPD in Spain, IPC in Canada, etc. are involved in defining rules on personal data protection. Also, US and EU have launched in Q1 2010 a new consultation (http://ec.europa.eu/justice_home/news/consulting_public/news_consulting_0005_en.htm) that aims to have a common International approach. At the end of the 31st International Conference of Data Protection and Privacy Commissioners, which took place in Madrid in November 2009, data protection authorities from over 50 countries approve the "Madrid Resolution" on international privacy standards which constitutes the basis for the drawing up of a future universally binding Agreement.

The speed at which the digital environment has moved in the last 4 years, plus the new possibilities emerging with Mobile phones, plus the Globalization which is inherent to the Internet, plus the size of this e-Economy, makes it very difficult to legislate or regulate to prevent such or such usage of personal data. Some of those authorities and certainly Ann Cavoukian, from Canada IPC, are proposing to shift and to reboot the system as it has been defined in order to address the new landscape (see, e.g., http://www.ipc.on.ca/english/Home-Page/).

SUMMARY

The following embodiments and aspects thereof are described and illustrated in conjunction with systems, tools, and methods that are meant to be exemplary and illustrative, not limiting in scope. In various embodiments, one or more of the above-described problems have been reduced or eliminated, while other embodiments are directed to other improvements.

An individual can have rights to engage with control:
information right→consent←data owner
update right→update←self-discipline/discernment
oblivion right→deletion←compliance identity/privacy A trusted third party can allow the Internet and/or Mobile user control to be informed, to give permissions, to give their preferences, and to engage.

DETAILED DESCRIPTION

Figure 1:
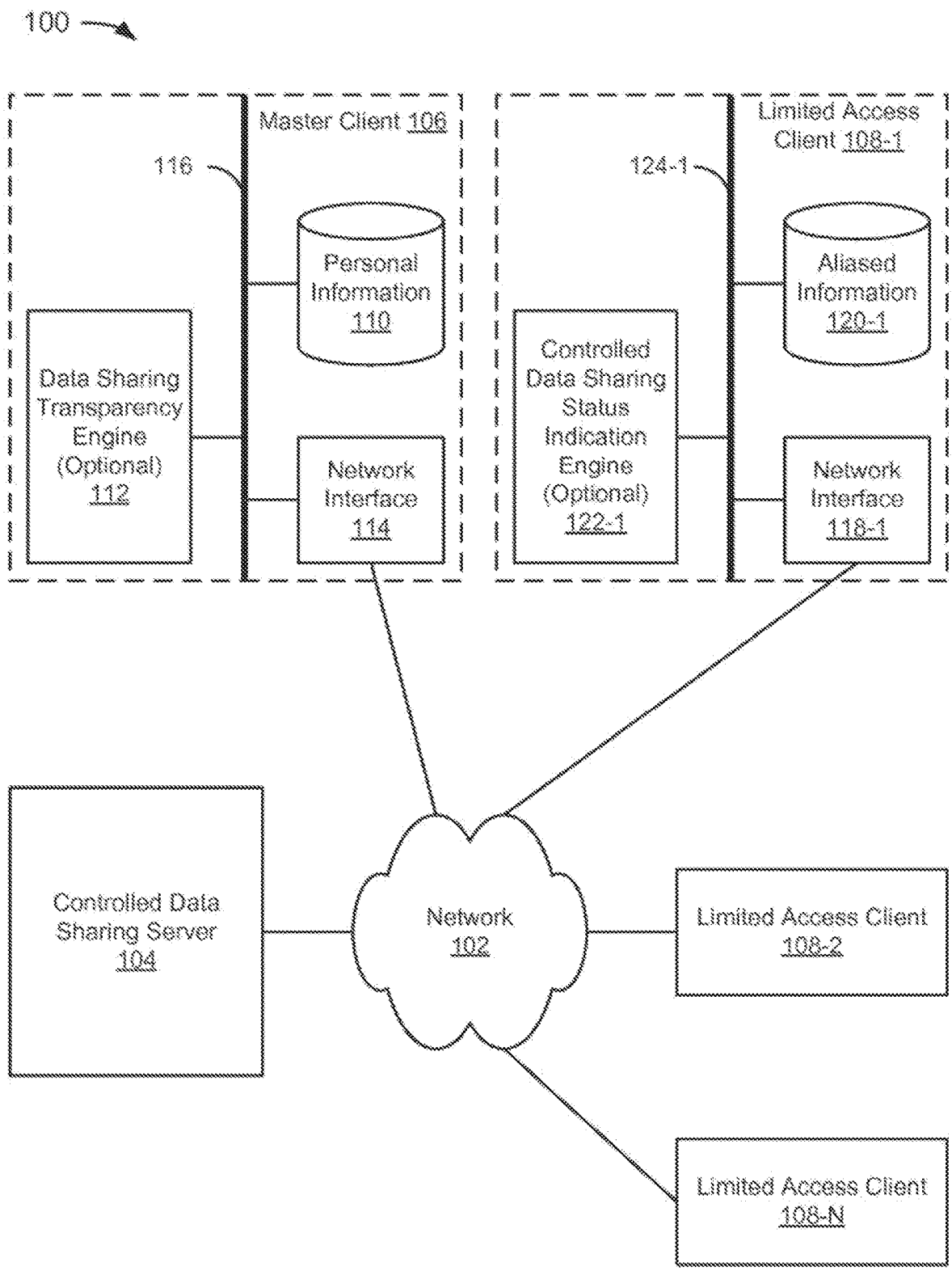
FIG. 1 depicts a conceptual view of a controlled data management system.

FIG. 1 depicts a conceptual view of a controlled data management system 100. In the example of FIG. 1, the system 100 includes a network 102, a controlled data sharing server 104, a master client 106, and limited access clients 108-1 to 108-N(referred to collectively as limited access clients 108). The network 102 can include the Internet, or any other network, as described later with reference to FIGS. 7 and 8.

The controlled data sharing server 104 can include various hardware and/or software components, as described later with reference to FIGS. 7 and 8. Using techniques described in this paper, the controlled data sharing server 104 can enable users to be reasonably assured that they will receive offers from companies they trust, feel empowered by informing them, making them confident, helping them engage in a transparent relationships, and/or rewarding them. Thus, consumers can become masters of their own digital fingerprints.

The system may also be of interest to governments because alias management can prevent personal data from leaving a country if implemented properly, without limiting the ability of users within the country to participate in international e-commerce. The various data available can be reported for consumers, system administrators, third party entities, etc., using a reporting engine that has access to data available and/or relevant to the particular entity. For example, the controlled data sharing server 104 has access to a great deal of data that can be used for the purpose of developing consumer behavioral marketing profiles.

The controlled data sharing server 104 can, for example, enable a user associated with the master client 106 to view a list of companies (e.g., eCommerce sites, Media or publishers sites, social networks, ISPs or any other sites, etc.) that hold a subset of the user's personal data (e.g., name; address; email address; mobile, home, office, or other telephone number; credit card information; age; sex; occupation; photos; etc.). The data can be obtained through user registration, provided by another company, or through some other means. As another example, the controlled data sharing server 104 can enable the user to view a list of companies that have put cookies, tags, or other information gathering/tracking devices on the master client 106 or other machines of the user allowing the monitoring of the user's Internet or other activity for behavior analysis, delivering targeted advertising, or other purposes. As another example, the controlled data sharing server 104 can enable the user to view a list of companies to which the user has given their email address, which was subsequently (or perhaps predicted to be) sold or otherwise shared with other companies (perhaps without the user's permission) from which the user or an agent of the user has received emails. If the user has received an email from one or more of the other companies, the user can, in a specific implementation, view a list of any of the other companies in association with the one company that has shared apparently the email address. As another example, the controlled data sharing server 104 can reward a user for usage of personal data or acceptance of behavioral targeting in a market place where the user can choose a list of topics/interests and/or choose to be contacted by Brands they have identified in their «trust list». As another example, the controlled data sharing server 104 can facilitate a user viewing offers from brands/companies, facilitate the user proposing brands/companies themselves, and/or enable the user to enter searches/preferences on a product or category; and enable the user to enter into an agreement for a period of time (e.g., while looking to acquire a product), for specific information or types of information, for a particular purpose, and/or the like. In addition, the user might receive offers from companies that are recommended by a party associated with the controlled data sharing server 104 or some other party, presumably though not necessarily if the user chooses to receive recommendations. Functionality of the controlled data sharing server 104 is described in greater detail later.

In the example of FIG. 1, the master client 106 includes a personal information data store 110, a data sharing transparency engine 112, a network interface 114, and a bus 116 operationally connecting the components. The personal information data store 110 can be implemented as a data structure (or multiple data structures) stored in a computer-readable storage medium. By way of example but not limitation, personal information can be stored as a record in a database, as arrays in a flat file, as a table in volatile memory, in an Internet PC/Mobile network or other cloud, or in some other convenient manner. A data store can include interfaces that facilitate access to data in the data store, and/or engines that perform other functions.

In a specific implementation, the personal information data store 110 includes an address book. Address books can have a variety of formats and configurations including by way of example but not limitation, Palm Address Book, Outlook Address Book, Mozilla Address Book, Entourage Address Book, Max OS X Address Book, or an applicable known or convenient address book type. An address book, or more generally a data store of personal information, can include practically any data, though particular implementations may include more or fewer fields or data structure types than other implementations.

As used in this paper, personal information can include practically any data that can be associated with a user. By way of example, but not limitation, personal information can include name, important anniversaries, home address, business address, home phone, home fax, cell phone, business phone, business fax, personal email, business email, favorite charities, wish lists, clothing sizes, favorite colors, favorite wines, favorite foods, favorite websites, items of interest, links to content, media files, software titles, pictures, video, settings (e.g., FACEBOOK®), etc.

In the example of FIG. 1, the data sharing transparency engine 112 is optional because the engine responsible for giving control over personal information to a user of the master client 106, establishing a virtuous circle between the user and other entities associated with the limited clients 108 based on trust through transparency, making sure the user is master of the personal information and is informed of its intended use by the entities, and/or providing a unique space in which the user can make use of Internet, mobile, or other services in confidence, could be implemented at the controlled data sharing server 104.

In a specific implementation, the data sharing transparency engine 112 can include a browser plug-in. For example, the plug-in could include a browser add-on that allows a user to securely and selectively collect information they leave on websites every day, adding and saving them in a personal data store. As another example, the plug-in could include a browser add-on that allows a user to access through a bar residing within a browser interface to set services and information both general and contextual to particular websites (e.g., the websites they are on) based on a collection of information. Advantageously, over time the plug-in can build a user's digital memory and identity, from which the user can benefit (e.g., find out, remember, control, and/or value). In a specific implementation, a plug-in can include an icon in a convenient location, such as an upper right corner of a browser bar, which gives access to a menu and/or on a form bar with icons at various places in a browser window.

The plug-in could enable registration with entities and help to obtain aliases for use with the entities at the time of registration, using techniques described in this paper. In an implementation that does not include a data sharing transparency engine 112, the master client 106 could include a browser or other engine for accessing a private space at the controlled data sharing server 104 to view or manage data, a user profile, or the like.

As used in this paper, an engine includes a dedicated or shared processor and, hardware, firmware, or software modules that are executed by the processor. Depending upon implementation-specific or other considerations, functionality of an engine can be centralized or distributed. An engine can include special purpose hardware, firmware, or software embodied in a computer-readable medium for execution by the processor. As used in this paper, the term "computer-readable storage medium" is intended to include only physical media, such as memory. As used in this paper, a computer-readable medium is intended to include all mediums that are statutory (e.g., in the United States, under 35 U.S.C. 101), and to specifically exclude all mediums that are non-statutory in nature to the extent that the exclusion is necessary for a claim that includes the computer-readable medium to be valid. Known statutory computer-readable mediums include hardware (e.g., registers, random access memory (RAM), non-volatile (NV) storage, to name a few), but may or may not be limited to hardware.

The network interface 114 can include various hardware and/or software components, as described later with reference to FIGS. 7 and 8. It should be noted that although only a single network interface is shown for the various clients in the example of FIG. 1, and in other figures in this paper, it is possible to use multiple network interfaces. For example, the personal information data store 110 could be distributed across multiple locations and coupled by way of a network. As another example, the personal information data store 110 could be remote relative to the data sharing transparency engine 112. So the network interface 114 should be construed broadly to include an applicable known or convenient mechanism for connecting the various components of a device to a network, regardless of whether sub-components of a particular component are distributed across multiple machines or the various components are distributed across multiple machines (as could be suggested by the depictions of the components in a single device in the examples provided in the figures in this paper, but which should be viewed as a specific implementation of a broader concept).

In the example of FIG. 1, the various components of the master client 106 are connected to a bus 116. It may be noted that alternative embodiments that do not connect some or all of the components to the bus 116 are possible, as would be apparent to one of ordinary skill in the relevant art. Therefore, the bus 116 could be considered optional.

In the example of FIG. 1, the limited access clients 108 include network interfaces 118-1 to 118-N(referred to collectively as network interfaces 118) and aliased information data stores 120-1 to 120-N(referred to collectively as aliased information data stores 120). The network interfaces 118 can include various hardware and/or software components, as described later with reference to FIGS. 7 and 8. The aliased information data stores 120 can include a subset of data found in the personal information data store 110, and the data can include empty containers or dummy values, and at least one alias to facilitate control of the data by a user associated with the master client 106 in a manner that is described later.

In a specific implementation, the limited access clients 108 can be agnostic regarding the controlled data sharing server 104. What is meant by agnostic is that the limited access clients 108 can be associated with enterprises that collect personal information from individuals, such as an individual associated with the master client 106, and collect personal information from the master client 106 in a manner that does not vary due to the existence of the controlled data sharing server 104. In such an implementation, an individual associated with the master client 106 would make use of the controlled data sharing server 104 to enter personal information, including an email alias, at one of the limited access clients 108.

Alternatively, one or more of the limited access clients 108 can be aware of their involvement in a controlled data sharing system. For example, an independent entity can request an entity associated with one of the limited access clients 108 to send a structured and/or standardized email to an email alias that the controlled data sharing server 104 has created for an individual that is specific to the entity. The structured and/or standardized email can include containers associated with personal information that is collected by the site and a link for an update, such as, for example, name of the company, purpose of the use of personal information, email (test-test@test.com), name, surname, date of birth, mobile phone, etc. As the term suggests, containers are not data values, but are rather the fields that the entity would normally attempt to fill with personal information from a user. Advantageously, collection of the personal information of a user could become unnecessary in some cases and/or implementations as there would be a standardized process to certify the users.

The user may or may not be able to use a mechanism, such as a browser plug-in, to request to update a user profile automatically by, for example, adding the entity to a list of trusted sites, populating containers associated with the entity, updating previously provided personal information with new information (e.g., if a phone number changes), obtaining an alias for the entity, and/or other activities associated with the entity or the data associated with the entity. However, in a specific implementation, an interface includes a set of features that allow users to remember, find out, and control what the Internet knows about them; and can allow the user to access a set of services that will help the user optimize their purchase intention and engagement with vendors, their exposure to advertising, and store useful information while looking for products/goods and finalizing ecommerce transactions. The interface can include a bar that is a companion of the user and is an assistant to the user for improving, securing, and accessing new services around personal data and engagement. Information the user can see or otherwise access through the interface can come from data collection and may only be accessible if connected as a user of the system.

In a specific implementation, an automated procedure can be put in place between the controlled data sharing server 104 and sites/companies that agree to send the information they hold on individuals. For example, the controlled data sharing server 104 can send to a trusted entity a list of registered individuals (e.g., emails); a company/site can send to the controlled data sharing server 104 a list of registered individuals (e.g., emails); or for each instance of a duplicate email, the entity can be requested to send the containers held for this email address with the date of creation and a link to update the data. Advantageously, a user associated with the master client 106 may be able to identify entities that collect their personal information and/or have agreed by way of cooperation with the controlled data sharing server 104 to be transparent. It may be desirable for the controlled data sharing server 104 to provide a dedicated "Companies" zone where, for example, entities can be requested to exchange data proactively, provide information about themselves or the personal information they collect, or the like.

Entities can benefit by cooperating with the controlled data sharing server 104. For example, the controlled data sharing server 104 can make users confident of the transparency of a site associated with an entity and therefore strengthen the relationship between users and the entity. The controlled data sharing server 104 can receive user personal information from cooperating entities that the entities have gathered. The controlled data sharing server 104 can aggregate the personal information in a personal space associated with the user.

Personal information can be tagged or otherwise made identifiable as associated with an entity or group of entities and convey information about the entity. For example, the controlled data sharing server 104 could identify personal information provided to an entity with a specific logo, which could be visible from an application/plug-in when the user is on the controlled data sharing server 104. In a specific implementation, the logo need not certify contracts for the user of personal data, which is done already by companies such as eTrust, but can still to demonstrate that the site/company is cooperating to ensure that personal information is used transparently to the user. The logo could take several forms and/or could convey information on the company/site that, for example, the site has agreed to send personal information held on an individual to the controlled data sharing server 104, the site sends the information and will not share with other companies, the site sends the information and will not sell/share with other companies without contacting the individual, the site offers an opportunity to exit if the user requests it, the site is currently in discussion for exchanging the personal data with the controlled data sharing server 104, the site does not wish to participate, the site has not responded to a request to cooperate, or the like.

A user associated with the master client 106 can manage/track their personal information in a space provided by the controlled data sharing server 104. The space can enable advertisers, research companies, publishers, agencies, etc. to promote/place their profiles search (for investigation, for monitoring behavior, for establishing panels, for conducting tests, etc.) with, for example, a description of the subject, the objective, duration, rewards associated, or the like. The space can enable individuals to see the profiles search, to respond, to ask questions, to provide personal information (including, e.g., behavioral data that could be generated by the controlled data sharing server 104 rather than explicitly provided by the user) transparently to an entity, to manage the granting of personal information (all or part), to track compensation for sharing personal information, or the like.

In a specific implementation, an individual can be given access to an auction system in which the individual could offer his "profile" (personal or behavioral) for a defined period at a price, entities could place offers for profiles, or both. This feature can enable, for example, real-time bidding for personal information. To protect privacy, it is likely that the space would only be accessible to subscribers to the system, whether the subscriber is a user with personal information or the subscriber is an entity that seeks personal information. Accessibility could be controlled with an applicable known or convenient technique for controlling access, such as by requiring the use of a username and password by subscribers to the service.

In a specific implementation, to ostensibly increase the quality of personal information, entities could be given the opportunity to rate the individual (e.g., scale from 1 to 10) regarding the "engagement" to participate. This rating may or may not be based on the fact that the individual has bought a product, clicked on banners, or the like, and could be limited to data derived from engagement terms of an agreement with the entity and associated personal information. Also, for the individual, during the auction of personal information or when responding to an offer for personal information, this rating can appear so the brands will be able to appraise the profile they are going to deal with.

In a specific implementation, a user can rate entities in the private space. If an entity has a sufficiently low rating (or is explicitly turned off) the company may lose the ability to solicit the user with email, offers, or the like.

Entities may work with agencies, ad servers, marketing firms, or the like to ensure that their promotions, advertising, targeting, etc. are effective for their brands. The controlled data sharing server 104 can also work with such agencies to provide a list of brands for targeting to individuals.

An individual can define what he wants and from who he wants to receive promotions. In a specific implementation, a search engine can include several dimensions in addition to more obvious dimensions such as product category, product, brand, or the like. A time dimension could enable a user to indicate a start and an end date. For example, if a user is looking for a promotion for a trip in the next 3 weeks the controlled data sharing server 104 could provide promotions for 3 weeks and then stop providing promotions. Also, the search engine could remember the search terms used in the initial search to eliminate the need for the user to reiterate the search multiple times over the indicated time period, and send criteria matches to the user.

Another dimension may be "my favorite brand." A user may wish to restrict promotions to brands/sites that are in the user's private space, select brands about which he wishes to receive information, allow brands to respond to a search recommended by other individuals, limit search results to the same type of products or otherwise related products, or the like. An advantage of this feature is that the results won't include all those intermediary companies/sites which do not bring any value to the search and just pollute the results because they have acquired keywords.

The results of a search can be promotions/ads, such as promotions that the individual has received by mail that the controlled data sharing server 104 has analyzed, promotions that correspond to the search (or at least some part of the search), real time promotions from brands/companies directly related to the search, or the like. It may be desirable to restrict clickable links to real promotions matching the search and not links to sites that are merely intermediaries or a home page. Users may be given the ability to report link results in their private space, block the associated search result from being displayed again, or the like, and the link may be marked as potentially not relevant, not relevant regarding a type of products, or not relevant in other contexts. A list could be made accessible to all users so that they can get the best value. Also, if the results appear in a specific promotions space, the individual could be asked to list the sites he wants some advertisement/promotions to appear on regarding his search, and a proper response (such as partnering with those sites) could be made. This approach is different from behavioral targeting because the consumer engages with brands and products in a different way, being fully aware of what he will get and how. As there are a lot of questions today on the value of banner advertising and efficiency, this approach will likely help increase value.

It may be desirable to offer other services like: Summarizing all the contacts of the Individual (Social Networking, Instant Messaging, Outlook, Mobile Phone, etc.); linking with social networks to develop the real-time context info; integrating a social network; and providing voting spaces, expression, evaluation, and opinion sharing.

Using the techniques described in this paper, the system 100 can be used to enable users, from, for example, a simple/single user interface, to become, day after day, master of their profiles. This can be accomplished by maintaining personal information held by companies (e.g. name, email, mobile phone number, age, sex, occupation, etc.); storing/viewing userids/passwords associated with each site/brand in a secure way; tracking newsletter subscriptions; knowing whether a user has bought something from a company, perhaps including transaction dates; knowing whether a site uses or has used a cookie and what is the use of data gathered or tracked in association with the cookie; facilitating direct access to a user profile on these sites via a direct link; asking to unsubscribe to information/newsletters from sites/companies on behalf of the user; ending a relationship with one or more sites (excluding sites where this relationship is required, such as Banks, Internet Providers, Mobile Operators, etc.); giving a score on the appreciation of a website/company regarding data privacy management/transparency and trust; enabling the viewing of an aggregated score (e.g., from subscribers to a service associated with the controlled data sharing server 104) for each company; updating certain personal information such as address, email, etc., and authorizing the controlled data sharing server 104 or an associated service to send an update to all or a user defined list of holders companies.

In a specific implementation, the system 100 can collect information by using a process the user has agreed to install/activate on a desktop/laptop/mobile, using buttons (widgets) that sites put on their subscription/profile page, and/or asking brands to send automatically the information they hold on the user to the controlled data sharing server 104 or an associated service. Presumably, users will desire that their personal information be protected. So, for example, the system 100 can be implemented such that an interaction with external Companies, whether for incoming or outgoing information, will be done through secured APIs and processes. Some such processes are described later.

In operation, the controlled data sharing server 104 and/or the data sharing transparency engine 112 enable a user control over personal information. For example, when a user enters or updates personal information at, e.g., a third party site, the controlled data management system can automatically collect some information depending upon rules that are implementation-, configuration-, and/or user preference-specific. Some such information can include a container only (e.g., Name: Yes, Surname: Yes, Address: No, etc. . . . ), the container and the content (e.g., Name: Yes, Value=«Test», Surname: Yes, Value=«Test1», etc. . . . ), or a combination.

The following examples refer to Facebook, but would be applicable to other sites. Information can be derived from a user clicking a «Like» button on Facebook. Then the controlled data management system can add the site and the information which are made available to it, presumably in accordance with user preferences. When the user is using an application in Facebook that is collecting personal information the application can be registered in the controlled data management system so the user can know, remember, and act at some point in the future. As Facebook offers ways to access which information they have that is associated with users and their profiles (friends, level of openness, etc. . . . ) and are using Oauth, the controlled data management system could automatically collect this information and make it clear in the controlled data management system.

The controlled data management system can also collect and track which cookies are active on a specific site when the user is surfing on and links to companies (often third parties such as Ad Servers, tracking companies, etc. . . . ).

In accordance with user preferences, the controlled data management system can also store login information for various sites. Login information frequently includes a userid and a password. The login information should be stored securely in an applicable known or convenient manner.

If a user provides personal information directly to the controlled data management system, which may or may not be possible depending upon the implementation, the information can be stored in one or more profiles. The controlled data management system can then propose that the user reuse some or all of the data of a particular profile when registering at a third party site.

A controlled data management entity can partner with third party entities (subscribers) and collect containers or data holders for individuals in general, or particular individuals. The controlled data management system can inform the user when new third party entities subscribe. The user can then, for example, click on an option to see which companies are subscribers and what personal information of the user the companies have (including the values if desired, assuming the controlled data management system actually has the values).

Figure 2:
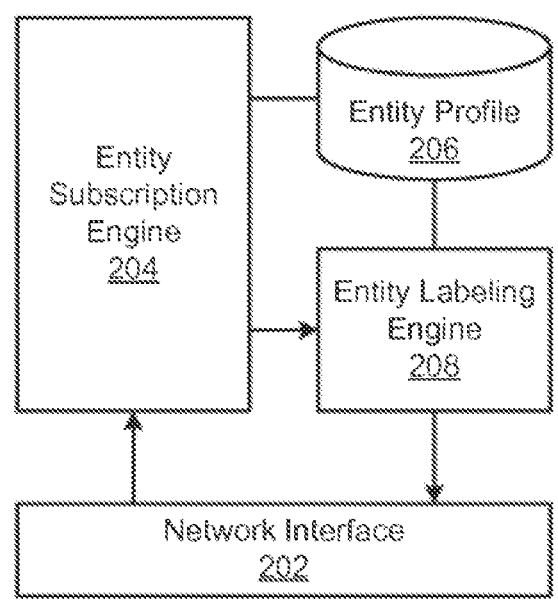
FIG. 2 depicts an example of a controlled data management subscription system for personal information consumers.

FIG. 2 depicts an example of a controlled data management subscription system 200 for personal information consumers. In the example of FIG. 2, the system 200 includes a network interface 202, an entity subscription engine 204, an entity profile data store 206, and an entity labeling engine 208. The network interface 202 can include various hardware and/or software components, as described later with reference to FIGS. 7 and 8.

In the example of FIG. 2, the entity subscription engine 204 is coupled to the network interface 202. The entity subscription engine 204 is operative to enable an entity to join a data management subscription service as a provider of content, goods, or services and/or as a consumer of personal information. The entity can contact the entity subscription engine 204 to form an association or the entity subscription engine 204 can contact the entity to form the association. The reason for making contact can include, for example, a user indicates an interest in a website, which triggers the entity subscription engine 204 to send an invitation to the website; the entity subscription engine 204 can receive an instruction from, e.g., an administrator to send an invitation; the entity subscription engine 204 could automatically search the network for potential partners and send an invitation when one is found; or for some other reason.

For illustrative purposes, it is assumed that the entity will collect some personal information about users, but it is possible that the information is an alias and only anonymous personal information is passed to the entity. Some entities may require certain personal information, but for illustrative purposes, it is assumed that at least a sub-part of the personal information is an alias. In a specific implementation, the aliased information includes an email alias. In alternative implementations, the aliased information could include an aliased phone number, an aliased name (e.g., a doing-business-as "DBA" name), an aliased address (e.g., a post office box), or the like.

It is possible for an entity to collect personal information from a user that is not shared with a controlled data management network. However, metadata can still be shared. For example, in a specific implementation, the entity subscription engine 204 can obtain via the network interface 202 data containers that are empty, have dummy values, or have aliases, and store the containers in the entity profile 206. The data containers represent one or more data fields that can be filled with information collected from users. By obtaining the containers from third parties, the system 200 can know what information a user has shared with the third parties without collecting the information at the controlled data management network. In a specific implementation, this option could be a "default" in the sense that there will not be any identifiable information collected by the system 200 except, for example, email, which was provided at registration.

In a specific implementation, a controlled data management system can facilitate user management of data fields by allowing the user to link containers from different entity profiles (or perhaps linking containers automatically). For example, if two entities have containers that are referred to as "Name," it is possible that the name provided by the user is the same for each entity. By linking the two, the user can make use of other procedures, assuming such procedures are implemented, to update "Name" for each third party entity simultaneously. In a specific implementation, willingness of an entity to cooperate in certain procedures can be stored in the entity profile data store 206. For example, entities that cooperate can enable the controlled data management system to go to a third party entity site and update user information on behalf of the user. Alternatively, a user could provide login information to the controlled data management system to enable the system to update information that changes on behalf of the user. Since it would probably be desirable to automate the update procedure, depending upon the implementation, the third party entities may need to enable automated updates, and whether the third party entities enable automated updates can be indicated in the entity profile data store 206.

In the example of FIG. 2, the entity profile data store 206 is coupled to the entity subscription engine 204. In operation, the entity subscription engine 204 obtains information about an entity to associate with the data management system, which is stored in the entity profile data store 206. It is possible to form an association without receiving any information from the entity. For example, a user could provide information about the entity or the information could be obtained in some other manner. An entity record in the entity profile data store 206 can include name of company, URL, phone number, and/or other applicable known or convenient fields. In a specific implementation, a status field indicates the relationship of an entity with a controlled data sharing entity. For example, the status field could indicate the entity has been requested to join a controlled data sharing network, but that no answer has been received; that the request has been denied; that the request has been accepted; that the entity has joined the controlled data sharing network, but shares personal information with affiliates; that the entity has joined the controlled data sharing network, but does not share personal information with anyone; that the entity is willing to accept that a user is certified through the controlled data sharing network without requiring any non-aliased information; that the controlled data sharing network has been granted the ability to update personal information with the entity if a user changes their personal information;

or other indications of status within the controlled data sharing network that are decided to be worth recording.

In the example of FIG. 2, the entity labeling engine 208 is coupled to the network interface 202, the entity subscription engine 204, and the entity profile data store 206. Status or other information about an entity can be stored in the entity profile data store 206 by the entity subscription engine 204. The entity labeling engine 208 can provide through the network interface 202 status or other information about an entity through a message or alert, a color-changing symbol or item, or other widget that accomplishes the goal of providing information about an entity that is associated with a website or other electronic presence. In an alternative implementation, the widget could be indicative of entity status based upon a physical location (e.g., through a GPS navigation system), a phone location (e.g., as a display on a smart phone), or through some other convenient mechanism in association with identifying information about the entity. Where it is desirable to distinguish between the various labeling technologies, an engine that provides a widget in association with an electronic presence can be referred to as an entity e-labeling engine, an engine that provides a widget in association with a physical location can be referred to as an entity location labeling engine, an engine that provides a widget in association with a phone number can be referred to as an entity phone number labeling engine, etc. In each case, the label is indicative of a relationship and/or status the entity has with a controlled data management network.

Figure 3:
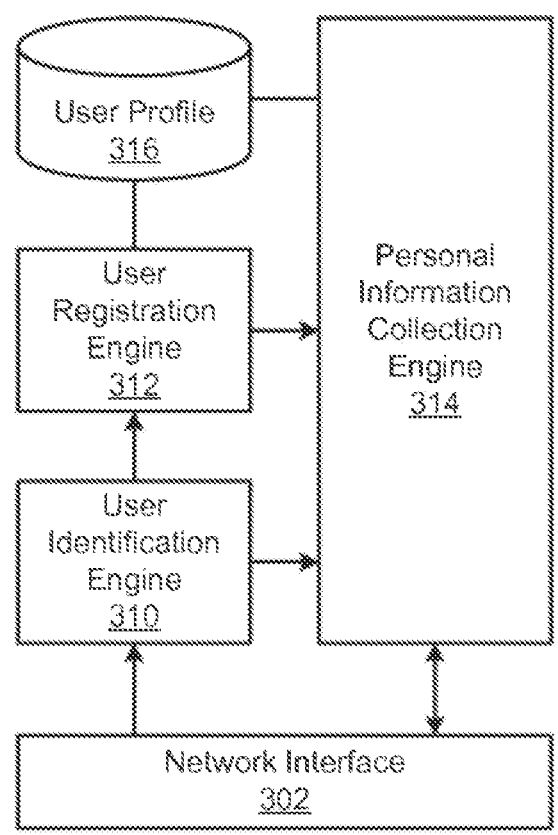
FIG. 3 depicts an example of a controlled data management registration system for personal information providers.

FIG. 3 depicts an example of a controlled data management registration system 300 for personal information providers. In the example of FIG. 3, the system 300 includes a network interface 302, a user identification engine 310, a user registration engine 312, a personal information collection engine 314, and a user profile data store 314. The network interface 302 can include various hardware and/or software components, as described later with reference to FIGS. 7 and 8.

In the example of FIG. 3, the user identification engine 310 is coupled to the network interface 302. The user identification engine 310 can be used to find users at particular locations. For example, a user could be identified by downloading an item to a machine, clicking on a link, navigating to a particular location on the web, explicitly identifying themselves on a social network, email site, or the like, etc. In an implementation that includes phone access, the user could be identified by making a telephone call. In a specific implementation, a user can be identified using data previously collected in a registration procedure. The user could, for example, register on a control management system.

In the example of FIG. 3, the user registration engine 312 is coupled to the user identification engine 310. When a user is identified, the user registration engine 312 can initiate a personal information collection procedure.

In the example of FIG. 3, the personal information collection engine 314 is coupled to the network interface 302, the user identification engine 310, and the user registration engine 312. The personal information collection engine 314 can collect data about users via the network interface 302. The information collected by the personal information collection engine 314 can depend upon whether an identified user is registered, whether the identified user has or is interacting with a subscribed entity, previously provided user preferences, or the like.

In the example of FIG. 3, the user profile data store 316 is coupled to the user registration engine 312 and the personal information collection engine 314. The personal information collection engine 312 can store information about a user in the user profile 314 when the personal information is collected.

When initiating a "quick" registration procedure, the personal information collected might include only an email address or mobile phone number. The personal information collection engine 314 can store the collected email address or mobile phone number in the user profile data store 316. The user registration engine 312 can generate an alias email address or alias phone number and store the alias in the user profile data store 316 in association with the collected email address or mobile phone number. Thus, a user can provide only a single field of data to the system 300 and have an alias generated in association with that single field of data. Of course, it is also possible to initiate, either after or instead of a quick registration procedure, a more comprehensive registration procedure during which the personal information collection engine 314 collects more data from a user during the registration procedure and saves the collected data in the user profile data store 316.

In an alternative, the user registration engine 312 could generate a user id and the personal information collection engine 314 could obtain a user password from a user (or the user could provide a userid instead of having one generated for them, or in addition to having a user identifier or user number generated for them). Thus, in this alternative, it is possible to register a user without collecting sensitive information. As used in this paper, "sensitive information" is intended to mean personal information that is useful for contacting or identifying the user outside of the system 300, such as an email address, a physical address, a phone number, or the like. Perhaps most information that a user would store in an address book could be considered sensitive information, but a userid that identifies the user only within a controlled data management system would not be considered sensitive information, since that information would not enable a third party to identify the user without more. It may be noted that even though the userid might not be considered sensitive information, it may still be desirable to maintain the userid in confidence.

In a specific implementation, the user registration engine 312 can enable a user to register in one of two ways. Using the first way, a user goes to a site associated with a controlled data management system and registers in an applicable convenient fashion. The first time a user registers with the controlled data management system, depending upon the implementation, the user may be prompted to enter a key value, such as an email address. This may or may not be combined with registering involvement with a third party entity to which the user may intend to share or may have already shared personal information. Using the second way, the user registration engine 312 can provide a module to the user, which can be embedded in a browser or other system associated with the user. The module could also be provided by bundling with a browser, system, or provider. The module can be activated automatically upon being embedded on the user-side, or can be activated by an event, such as when the user selects an option to activate, the user goes to a particular site, the user registration engine 312 activates the module remotely, or the like.

In a specific embodiment, the user registration engine 312 can prompt a user to select a language and then select a "Register" option. The register option can be displayed on a website associated with the controlled data management system, on the user's browser, in an email message sent to the user, as a menu option, or the like. Upon selection of the option to register, a popup Window can be generated, the user can be sent to a site associated with the controlled data management system, or the like. After the first registration, it is unlikely that the user will need to again provide the key value, and may simply be given the option to register involvement with a third party entity in subsequent registrations.

When a user has registered or is registering, the user registration engine 312 can log registrations, updates, likes, cookies, etc. associated with the key value (e.g., email address, phone number, etc.) provided by the user either directly or indirectly while, e.g., browsing on sites. After a certain number of sites have been logged, the user may be prompted to register one or more of the sites. By way of example but not limitation, when the user has registered at 10 sites holding personal information of the user, the user registration engine 312 can pop up a window with this list of sites and propose the user to register one or more of the 10 sites.

The user registration engine 312 can be configured to request minimal information, such as country of residence and a key value (e.g., email address, phone number, etc.). It would be desirable for the key value to be a value that the user employs for the purpose of making purchases, subscriptions, social networks, or other activities. In other words, the key value should probably not be a dummy value. The key value is important to the controlled data management system because it can serve as the main point of contact between the individual and third party entities, and the controlled data management system will use to constitute the list of personal data holders.

The user registration engine 312 can be configured to request or assign a userid, which can be a nickname, the user's email address, or some other convenient value, and a password.

When an initial registration process is done, the user registration engine 312 can: 1) show the user a list of sites where there's a strong chance that he has given a profile (Facebook, Google, Amazon, Ebay, MSN, Yahoo!, local ISPs, etc.); 2) ask the user to choose one to which he knows he has given his personal data; 3) redirect the user towards a profile page associated with the controlled data management system; 4) prompt the user to enter his username and password; 5) ask the user to right click onto a logo on his desktop/browser and choose "Save this Profile;" 6) prompt the user to change his email address by going onto the email field, then right click on the logo and choose "Generate an alias email address," which will replace his email address in the field and the confirmation field as well. The user can then save the form. All emails sent by this company to the new alias email address will be forwarded to the previous email address.

After a user has been registered, user information can continue to be collected. In a specific implementation, the personal information collection engine 314 can initiate a procedure to push a software module to a machine associated with the user or the user can initiate a procedure to download a software module to a machine associated with the user. The software module can include procedures that facilitate the implementation of a data sharing transparency engine on the user's machine (see, e.g., FIG. 1, the data sharing transparency engine 112). Alternatively, instead of putting a software module on the user's machine, subscribers to a controlled data management service can include links from their site to the system 300.

In general, the personal information collection engine 314 can collect data via the Open Social process, via a controlled data management system process, via a robot, via sites/ advertisers/media, or other applicable techniques. OpenSocial Specification v0.9, dated Apr. 15, 2009, of the OpenSocial and Gadgets Specification Group is incorporated by reference. The user can authorize the controlled data management system to use fetching information and/or obtain data from social networking sites that use the Open Social standard.

The controlled data management system process is in addition to or instead of using a data sharing transparency engine at a user's machine (see, e.g., FIG. 1, data sharing transparency engine 112), which enables the user to grab data given to brands/sites when registering or updating personal information on the respective sites or, in general, when providing personal information to a third party. The controlled data management system process can include two different processes: 1) The user has already provided personal information and wants to save the data to a profile on the controlled management system. When on, e.g., a personal profile page, the user can, for example, right click on a button displayed on the user's desktop, within a browser, on a smart phone, etc. and choose to save the personal information to a profile associated with the user (note: in a specific implementation, each user can have multiple profiles). It may also be desirable to detect that the user has provided personal information and automatically perform the update, presumably in accordance with user preferences, without asking anything of the user. 2) The user is entering or updating personal information. The controlled data management process residing on the user's desktop, browser, or the like can intercept data as it is entered and can automatically save the data to a relevant profile of the user. In either of cases 1) and 2), when the user exits a page or otherwise reaches a point that can be characterized as completing the data entry, the controlled data management process can recapitulate what is going to be sent to the controlled data management system, and have the user validate the personal information and/or confirm that the data should be sent to the controlled data management system.

With a robot, the controlled data management process can use login information of a user (presumably in accordance with user preferences) to access sites and obtain personal information at the sites. The sites can be presented as a list to the user, who can choose which sites the controlled data management system should access. This can be accomplished, for example, by executing a robot on the profile page on each applicable site, which can crawl the content page and automatically capture the personal information held by the site. Normally this would require agreement from each site to allow the robot to crawl their site. Through a similar process, the robot can also be used to update personal information at the site that has changed since the user last provided the data.

A user can allow the controlled data management system to request third party entities, such as advertisers, media providers, companies, websites, etc., perhaps when the entities hold at least one of the individual email address/mobile phone number of the user (matching database process to be done with a third party) to send some or all of the related personal information they have on the user. The controlled data management system can also request data regarding the use of cookies at the site (cookies can be used to do behavioral targeting). The user can, over time, get an increasingly comprehensive list of brands/companies. This can enable the user to sort by email addresses/mobile phones numbers. It may be desirable to have a third party (such as Axciom) perform the extraction of common emails/Mobile phone numbers between users of the controlled data management system and third party entity subscribers to the controlled data management system. When the list of common emails/Mobile phone numbers is extracted, then an entity subscriber can extract the personal data it holds on each member of the list. The entity subscriber can then send the data to the controlled data management system through a secured process and stored at the controlled data management system. Alternatively, the sites could be requested to send to only data containers but the not the content.

The controlled data management system can labelize entities that agree to participate by, for example, delivering them a logo that they can put onto their web site to indicate to visitors that they are certified. There may be multiple logos reflecting the level of transparency (sharing of personal data, behavioral targeting, resell/give email addresses to third parties which spam or not, etc. . . . ), a rating issued from other users, or the like. As another example, the controlled data management system can certify entities by changing color or other characteristics of a logo that is in users' browsers, desktops, etc. such that when users enter the site, they will know very quickly whether the site is participating in the controlled data management program. As another example, the entities could be given the option to automatically send an email to relevant users who are registered with the controlled data management system.

Third party entities may also be motivated to participate in order to have their information on a user's data sharing transparency list of companies with which the user has shared personal information. This could avoid and/or complement, for example, the Axciom process.

For third party entities that do not accept to send information to the controlled data management system (and/or those that have not accepted, but have not yet declined), the controlled data management system can have a specific color of the logo that users can have installed on their machine. Then, users will know as soon as they are entering a site that is not sending information to the controlled data management system. However, if the user wishes to register or update personal information, the user can use a data sharing transparency engine to save the information on the controlled data management system.

Examples of data which could be collected and saved:

Example 1

Container
  Email: joe.smith@example.com
  First Name?: Yes/No
  Last Name?: Yes/No
  Date of Birth?: Yes/No
  Address?: Yes/No
  Post Code?: Yes/No
  City?: Yes/No Example 2

Container and Content
  Email: joe.smith@example.com
  First Name: Joe
  Last Name: Smith
  Date of Birth: 01/01/1970
  Address: 234 Example Street
  Post Code: 99999
  City: Example City
  Country: Example Country Example 3

Container
  Email: joe.smith@example.com
  Name?: Yes/No
  First Name?: Yes/No
  Date of Birth?: Yes/No
  Company?: Yes/No
  Title in Company?: Yes/No
  Photo?: Yes/No
  Email address shared with other companies?: Yes/No
  Cookie on user machines?: Yes/No Example 4

Container
  Mobile Phone Number: 999 99 99 99 99
  Name?: Yes/No
  First Name?: Yes/No
  Gender?: Yes/No
  Age Range?: Yes/No Apart from Email and Mobile Phone Number, which are treated as keys in these examples, the other fields are not necessarily filled with their value, but only: Yes/No, which means owned or not.

In a specific implementation, a user can create/update a profile to enable automatically pre-populating fields during registration on sites and updating once in the controlled data management system some data (e.g., home address after a move) and ask the controlled data management system to send the update to relevant entities.

The controlled data management system can use a standard & distributed data management system to store data in a secure manner, a solution such as Cassendra in order to manage the data and not relational databases, or some other solution that meets the needs of scalability, security, and other applicable concerns.

Advantageously, as users and third party subscribers become more integrated into the controlled data management system, the personal data of an individual can take on the properties of objects in the physical world that exist in only one place at a time. That is, the user will know where personal information resides. With this kind of control, a user can give companies permission to access certain personal information for a period of time (and then stop access). This could ultimately mean that companies would, instead of some personal information, get: a non reversible unique identifier «U_Id» generated by the controlled data management system representing the individual (encryption of email/mobile phone number) perhaps with a validity expiration (end of the period of time the user has authorized the company to use his data); all the personal data the individual would have declared/given to this company would be then accessed by the company for a period of time through a controlled data management API; at the end of the period, the API would disconnect the «U_Id» from the data therefore the company wouldn't be able to access the personal data of the individual. Another advantage is that to insure that next time the user is entering back into a relationship with a third party entity, the user wouldn't have to re-enter all the information, which can be maintained on the controlled data management system or on the user's machine. What the companies could keep is perhaps some aggregated data (age/revenue range, city, . . . ) to perform statistics.

Figure 4:
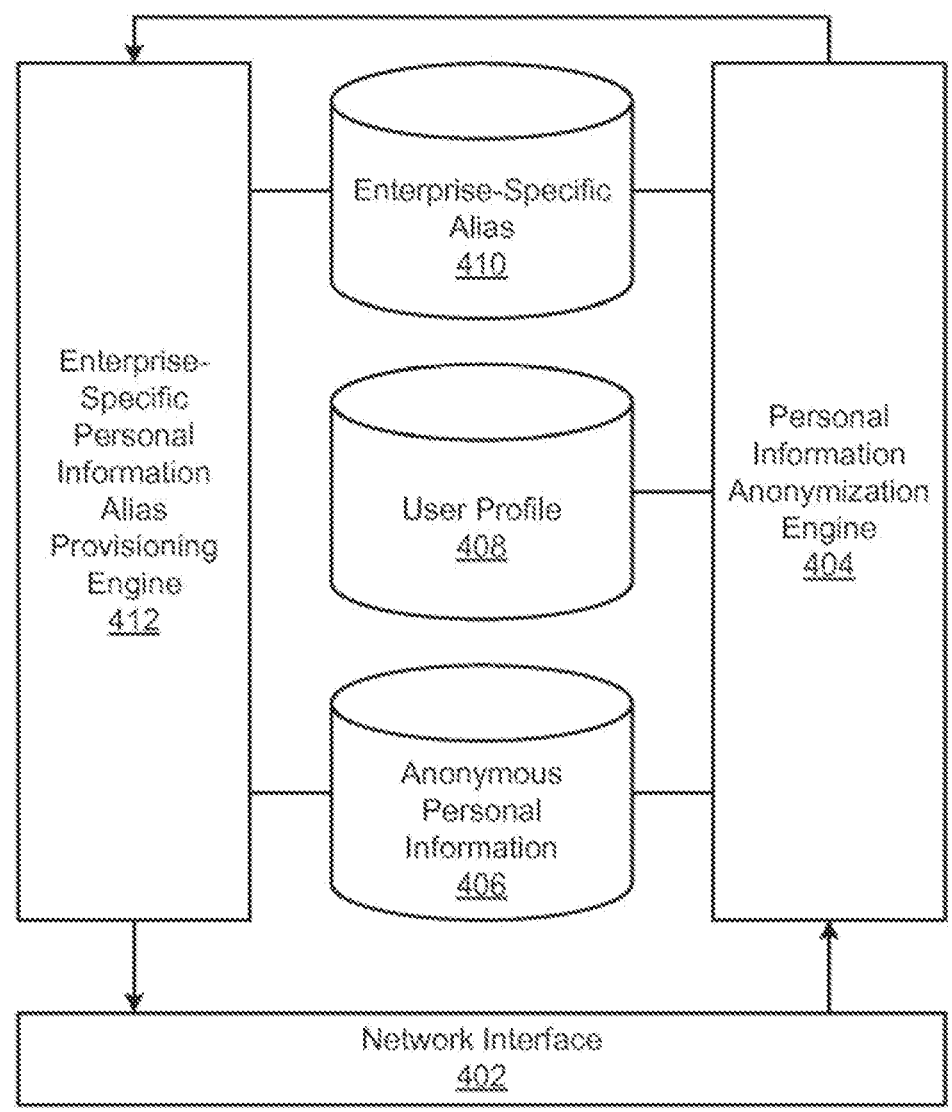
FIG. 4 depicts an example of a personal information aliasing system.

FIG. 4 depicts an example of a personal information aliasing system 400. When a user proceeds to the declaration of personal information during a purchase or registration on an internet/mobile site (e.g., social networking, publisher website, Brand, Company Studies, etc.), the personal information aliasing system 400 can generate, e.g., a unique email address (an email alias) for this site/brand that will be the mailbox used for the user. In a specific implementation, the user associates a personal email with the email alias. It may be noted that information aliasing can be accomplished during a registration period (see, e.g., FIG. 3) for a first alias, and an identical or similar procedure can be used for registering second or later aliases. Thus, "registration" can refer to either a user registration (a first time) or entity registration (every time or after the first time).

In the example of FIG. 4, the system 400 includes a network interface 402, a personal information anonymization engine 404, an anonymous personal information data store 406, a user profile data store 408, an enterprise-specific alias data store 410, and an aliased enterprise-specific personal information provisioning engine 412. The system 400 can be implemented at a controlled data sharing server (see, e.g., FIG. 1, controlled data sharing server 104). However, the server may or may not maintain personal information in the anonymous personal information data store 406, and may or may not maintain some or all personal information provided from a user to a third party.

The network interface 402 can include various hardware and/or software components, as described later with reference to FIGS. 7 and 8. The network interface 402 is coupled to the personal information anonymization engine 404 and the aliased enterprise-specific personal information provisioning engine 412.

In the example of FIG. 4, in operation, the system 400 receives data on the network interface 402. To the extent the data includes personal information, the personal information anonymization engine 404 stores the personal information in the anonymous personal information data store 406 to which it is coupled. Rather than personal information, the data could include data fields or containers that are associated with personal information. The user profile data store 408, also coupled to the personal information anonymization engine 404, can include a record associated with a particular user that enables the container to be filled with data from the user profile data store 408.

Alternatively, the system 400 could enable aliasing without storing any personal information, but in such an implementation, it may not be able to push messages to the user; the user would perhaps have to login to the controlled data management site. However, it is reasonably likely that the user will have to provide personal information to third parties if none is stored at the controlled data management system. If, on the other hand, at least some personal information is stored at the controlled data management system, third party entities may trust that a user is real by virtue of the fact that the user is registered with a controlled data management system and perhaps enable a user to provide only dummy values or aliases instead of personal information.

Alternatively, it may be desirable to implement a system in which no or relatively little personal information is provided to third party entities. In such an implementation, the fact that the user has a user profile can serve as adequate evidence that the user is real. In this way, sites that rely upon personal information to certify a user could rely instead upon the independent server to confirm that the user should be allowed access to a particular service without requiring that any personal information actually be sent. Depending upon the implementation, the container could be filled with dummy values, aliases, or left empty.

One field of personal information that is of particular significance for electronic correspondence is the email address of the user (for mobile communications implementations, the mobile phone number of a user is of particular significance). The personal email address of the user is not provided to third parties, and may or may not be stored in the user profile data store 408. Instead, the personal information anonymization engine 404 generates an alias for the user, which is stored in the enterprise-specific alias data store 410 to which it is coupled. In order for the system 400 to be able to generate the alias for each third party entity, the user must somehow (the technique can depend upon the implementation) inform the system that personal information is to be provided to an enterprise. This could be providing a URL associated with the enterprise to the system 400. For illustrative simplicity, it is assumed that the URL or other identifying data is included in the data provided from the user to the personal information anonymization engine 404 or can be found in the user profile data store 408 and identified using user-provided data. The URL could also be obtained through third party entity subscription to the controlled data management system, and implicated by identifying the user at the third party entity site through the use of a browser plug-in, notification by the third party entity, or the like. To avoid that the user is asked to alias email anytime entering it (e.g., at login), the URLs passed to the system 400 could be classified and identified over time. If the user is asked in error to alias one email, the user could be offered an option to report it to the system, which can then improve over time.

Advantageously, an alias is generated for each third party entity (or group of entities). So if a third party entity shares data with other parties that attempt to contact the user, the controlled data management system will be able to detect that the entity-specific alias is being used by a party for which the alias was not generated. The controlled data management system and/or the user can then decide how to treat the third party that shared personal information and/or the other party that presumably obtained the personal information from the third party.

It may be noted that in an implementation that includes providing actual personal information, such as name, phone number, or the like, the personal information is still referred to as "anonymous" in this paper when the email alias is provided in lieu of an actual personal email address. While it may be possible to track down a user for which an enterprise has a name or other personal information, the email address can be maintained in secret. Thus, the term "anonymous," as used in this paper, can refer to complete anonymity when no personal information is provided, some anonymity when only a subset of requested data is provided, and at least email anonymity when all requested personal information is provided (where a requested email address is replaced with an alias email address). Where a distinction between the levels of anonymity is desired, "complete anonymity" can refer to when no personal information is provided to an enterprise and "email anonymity" can refer to when at least the email address of the user is replaced with an alias email address. It is also possible to have "phone anonymity," or more specifically "mobile phone anonymity," or some other form of anonymity associated with a particular personal information field that is replaced with an alias value or otherwise withheld.

In the example of FIG. 4, the aliased enterprise-specific personal information provisioning engine 412, which is coupled to the personal information anonymization engine 404, combines personal information from the anonymous personal information data store 406 with the relevant email alias from the enterprise-specific alias data store 410. The aliased enterprise-specific personal information provisioning engine 412 sends the data to the relevant enterprise via the network interface 402. As was previously mentioned, the personal information can include empty containers, dummy values, or aliases; and the user may provide the personal information without passing the information through the controlled data management system. Also, in a specific implementation, the enterprise-specific personal information alias provisioning engine 412 can provide the alias to the user so that the user can give the alias in association with any other personal information to a third party entity without the system 400 getting involved in the registration procedure. The alias will still result in correspondence from the third party entity coming to the controlled data management system for analysis and forwarding to the user, and the user may wish to correspond with the third party entity by sending a message to the controlled data management system, which can replace the user's contact information with the relevant alias. This may or may not include filtering email signatures for contact information that is not aliased, and either removing or replacing the items in accordance with user preferences, or alerting the user that a message may include sensitive information.

Figure 5:
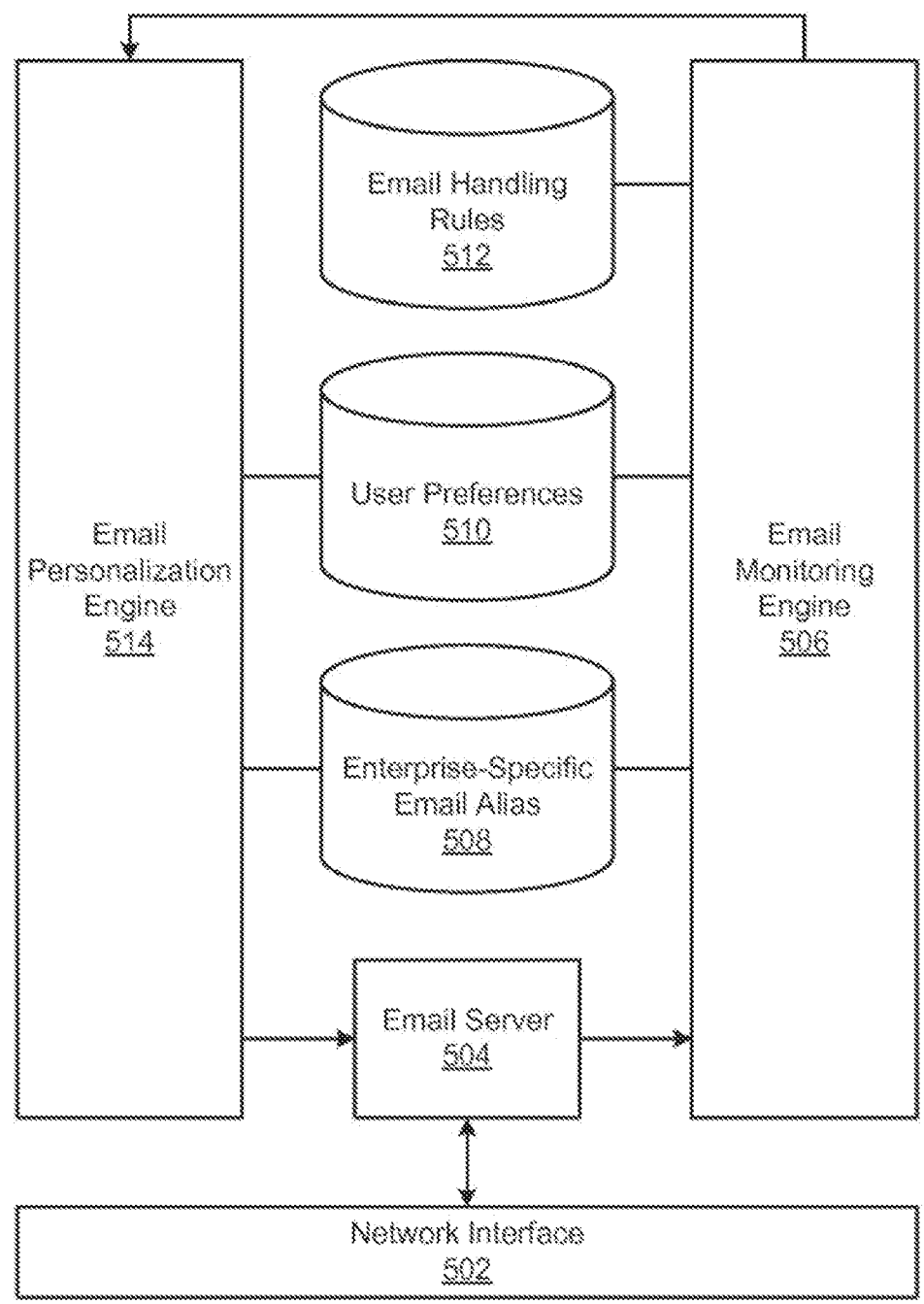
FIG. 5 depicts an example of an alias-aware email server system.

FIG. 5 depicts an example of an alias-aware email server system 500. When an alias email address is used instead of a personal email address to register or update a profile on a site, and if the site sells or provides such information to another company that uses the email alias to contact the user (perhaps without having received authorization), the user can learn of this event using the alias-aware email server system 500. This can enable the user to identify the company that sent the email and the company that shared the information. Then, the user can act as the user deems appropriate, such as by blocking emails from the new company and/or contacting the entity that shared the information to complain. Of course, this service operates in cascade (Company A sells to Company B email—sending a message—which in turn sells to Company C—which sends a message—etc. . . . ). It may be noted that most of the time companies that share personal information are within their rights because the practice is mentioned in their terms of use, but the user is not necessarily aware.

In the example of FIG. 5, the alias-aware email server system 500 includes a network interface 502, an email server 504, an email monitoring engine 506, an enterprise-specific email alias data store 508, a user preferences data store 510, an email handling rules data store 512, and an email personalization engine 514. The network interface 502 can include various hardware and/or software components, as described later with reference to FIGS. 7 and 8. The network interface 502 is coupled to the email server 504.

In the example of FIG. 5, the email server 504 is coupled to the email monitoring engine 506 and the email personalization engine 514. The email server 504 is operable to receive email from an enterprise via the network interface 502 and to send personalized email to a user via the network interface 502. In a specific implementation in which the user associates a personal email with an email alias, an independent email analysis engine can perform without substituting for a mail server to offer users a personalized and useful "reading" of commercial messages. So the mail server could be implemented on a third party machine, and the email server 504 could be referred to as an "email monitoring server."

In the example of FIG. 5, the email monitoring engine 506 is coupled to the enterprise-specific email alias data store 508, the user preferences data store 510, and the email handling rules data store 512. It is assumed for illustrative purposes that a personal information aliasing system (see, e.g., FIG. 2, system 200) was used to create an email alias for a user. Since the email alias is specific to a particular entity, the email monitoring engine 506 can map the email destination of an email received from an enterprise to a particular user using the enterprise-specific email alias data store 508. The email monitoring engine 506 can make a determination based upon the source of the received email as to whether the email is from the entity with which the email alias is associated. Thus, the email monitoring engine 506 can act as a warning system that an alias has been compromised.

The email monitoring engine 506 can check the user preferences data store 510 and the email handing rules data store 512 to determine how to treat the received email message. For example, if user preferences indicate that the email alias is no longer active due to a time limit on the life of the email alias, the email monitoring engine 506 can filter the email.

As another example, if the email alias is apparently from an entity other than the entity with which the alias is associated, the email monitoring engine 506 can handle the email in accordance with user preferences and take other actions in accordance with email handling rules, such as notifying the (first) entity associated with the alias to find out why a second entity used the email alias. Use of the email alias by the second entity can be indicative of sharing of personal information. User preferences may include a preference to be notified when an email alias is used by an entity with which it is not associated. Since, in a specific implementation, the user has access to a list of entities that have sent an email without receiving the user's specific consent (a priori), the user can set a preference to cause the email monitoring engine 506 to act as spam filter on one or more these companies. More generally, a user may be able to set preferences to filter any email coming from a specific company.

As another example, the email monitoring engine 506 can store data associated with the email in a historical data store (not shown). For E-Commerce sites on which a user has given an email alias and made a purchase, the email monitoring engine 506 can analyze the content of confirmation emails sent each time a purchase is made, and facilitate access by the users to a synthetic view of all Internet purchases for the week, month, quarter, year. This can give a clear view of spending per type of product, give a clear view of family spending, and allow identification of fraud, which is starting to be a big problem for detection purposes when expenditures are for small amounts, such as iTunes songs.

Historical data can also be used for promotions. For example, through a search engine interface, a user can be presented with promotions concerning a particular type of product/brand. This could be a synthesis of promotions for a particular product/brand by user interest as predicted by the historical data.

In the example of FIG. 5, the email personalization engine 514 is coupled to the email server 504, the email monitoring engine 506, the enterprise-specific email data store 508, and the user preferences data store 510. When a user sends an email to a third party entity, the email personalization engine 514 can remove sensitive information, replace the sensitive information with dummy values or aliases, or the like. While the email personalization engine 514 can be configured to automatically identify certain character strings that are likely to include sensitive information, such as email addresses, URLs, phone numbers, credit card numbers, or other character strings that have distinctive formats, the more information that a user provides to the controlled data management system, the more effective the email personalization engine 514 can be at anonymizing information. For example, if the email personalization engine knows the phone number of the user and also knows that the third party entity to which an email is being sent has a dummy value for the phone number, the email personalization engine 514 can replace a phone number in the signature block of the email with the dummy value (presumably in accordance with user preferences).

When a user receives email from a third party entity, the email personalization engine 514 can update the email with useful information. For example, the user's email alias can be replaced with the user's actual email address so that the message can be sent to the user, the enterprise-specific email alias data store 508 can be consulted to confirm that the email comes from the entity with which the alias is associated and take corrective actions if the alias is not associated with the sender, a trust indicator can be included in the email to indicate the level of trust the controlled data management system has regarding the third party entity (e.g., if other users are receiving spam from a first entity to an alias that was provided to a second entity, the trust in the second entity can be reduced even before the current user receives the spam; and/or the indicator could show that the third party entity is not a subscriber to the controlled data management system, has declined to become a subscriber, or is a subscriber), relevant historical information or analysis can be included (e.g., last transaction(s) with the company, the last 4 numbers of the credit card used in the transaction, the total amount of transactions with the company, the recent amount of transactions with the company, etc.), custom hyperlinks to words that are of relevance to the controlled data management system (e.g., user aliases or dummy values can be hyperlinked to enable the user to access the actual values, values that do not appear to have been provided by the user to the third party entity could be hyperlinked to enable the user to update containers or values at the controlled data management system or to take other actions if the third party entity should not have had the information), aliases or dummy values could be replaced or the actual values could be added parenthetically next to the aliases or dummy values, or the like.

In a specific implementation, a system similar to the system 500, but for phone applications that alias the user's phone number instead of the user's email address could be used. Other similar systems, such as a geographic address system, could also be implemented. And the various systems could be combined to enable multiple aliases for various contact or other identifying information.

Figure 6:
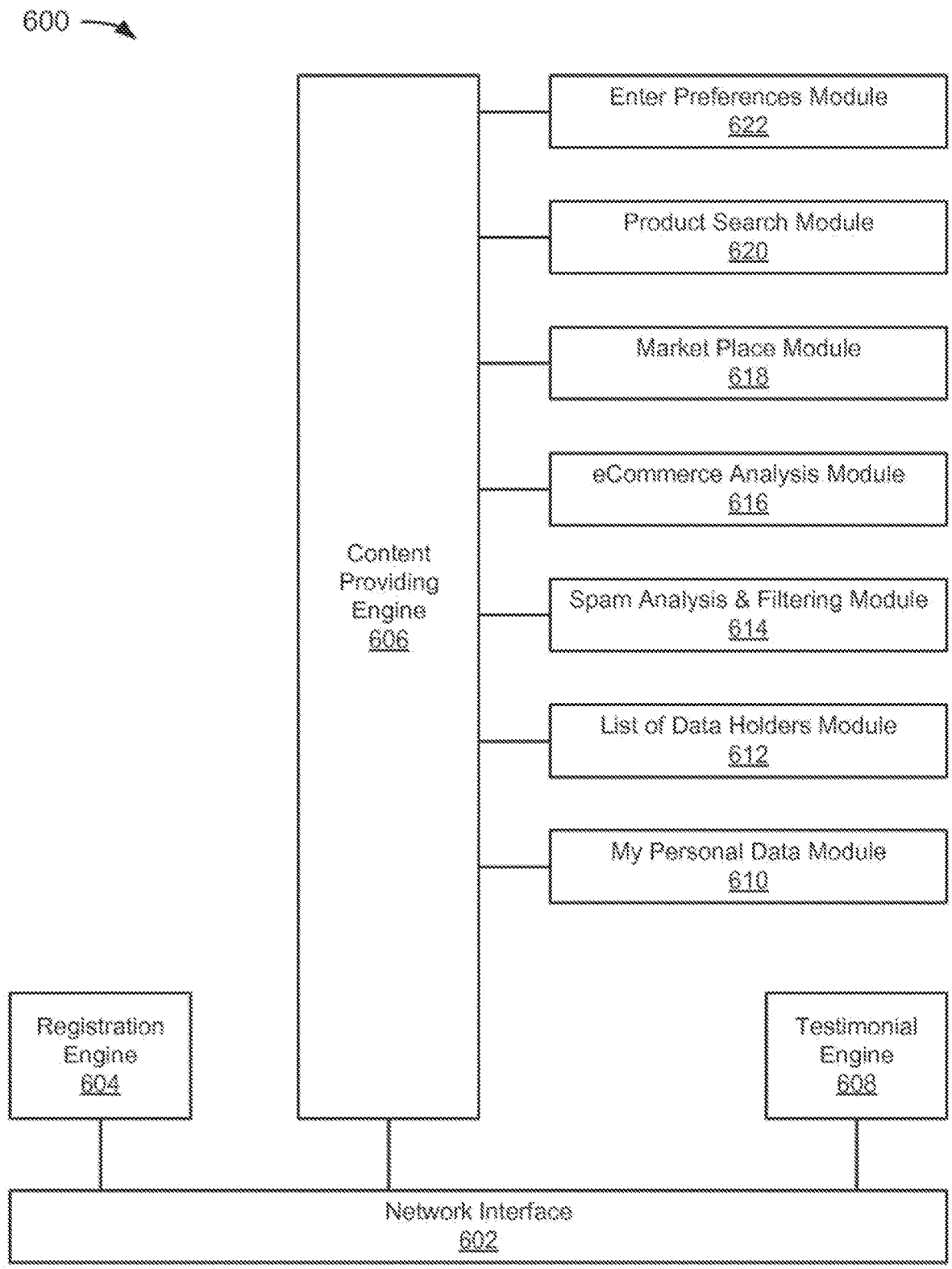
FIG. 6 depicts an example of a system for providing services to a user of a controlled data management system.

FIG. 6 depicts an example of a system 600 for providing services to a user of a controlled data management system. In the example of FIG. 6, the system 600 includes a network interface 602, a registration engine 604, a content providing engine 606, a testimonial engine 608, a my personal data module 610, a list of data holders module 612, a spam analysis and filtering module 614, an ecommerce analysis module 616, a market place module 618, a product search module 620, and an enter preferences module 622. Advantageously, since users can protect their identities effectively using aliases, a market place can be built on top of a system that makes use of the techniques described in this paper. Personal data need not actually be stored on a centralized server (e.g., it could be stored on a personal computer and provided as needed using a plug-in, or in some other manner, such as described elsewhere in this paper).

In the example of FIG. 6, the network interface 602 is coupled to the registration engine 604. An example of a registration engine was described previously (see, e.g., FIG. 3, user registration engine 312).

In the example of FIG. 6, the network interface 602 is coupled to the content providing engine 606. The content providing engine 606 can provide users with, potentially among others, options for managing their personal information. For example the content providing engine 606 can enable a user to select a "List of Data Holders" to view personal data held by a site, either in general or specifically with respect to the user, and a link to access it. As another example that is of particular relevance to ecommerce sites, when a user buys something, an email monitoring engine can analyze an email sent by an ecommerce site such that the user can view a synthesis of a latest purchase, or a combination of purchases, using "eCommerce Analysis." As another example, the content providing engine 606 can enable "Spam Analysis," which can be a highlighted menu option when there is something new in the spam analysis folder. If a first site to which the user has given personal information shares the information with a second site that then uses an alias that is associated with the first site, an email monitoring engine can detect the use of the alias by the second site. The user can select an appropriate action or preference in association with spam.

In the example of FIG. 6, the network interface 602 is coupled to the testimonial engine 608. The testimonial engine 608 can enable a user to recommend the controlled data management system to a friend through facebook, twitter, or some other recommendation channel. The testimonial engine 608 can also facilitate entry of recommendations or comments on third party entity subscribers, products, etc. to the system.

In the example of FIG. 6, the my personal data module 610 is coupled to the content providing engine 606. The content providing engine 606 can use the module to provide access to the personal data that the individual has entered (e.g., email, country, mobile phone number, etc.). As with each of the modules, and in general any module described in this paper, the module can be treated as part of an engine, such as the content providing engine 606. The modules can also be representative of buttons or menu options on a website or other display.

In the example of FIG. 6, the list of data holders module 612 is coupled to the content providing engine 606. The content providing engine 606 can use the module to enable a user to see a list of companies that are holding his personal information and which fields are being held for a particular company (either displayed in the list or when the company is selected from the list to display more detail). The user may also be able to see what fields are required at the company, which are optional, which are filled with dummy values (assuming the controlled data management system knows which values are dummy values), which are aliases, which are null (e.g., if the third party data holder is known to collect a particular data field, but do not have data in that field for the user), or the like. Depending upon the capabilities of the system 600, a user may be able to take some actions in association with the data holders, such as unsubscribe to newsletter/promotions; opt out from their database; opt out of behavioral tracking (cookies, . . . ); rate the company; agree to send an updated profile to the company (when changing an address, phone number, etc. . . . ); or the like.

In the example of FIG. 6, the spam analysis and filtering module 614 is coupled to the content providing engine 606.

The content providing engine 606 can use the module to enable a user to see a list of companies that are using an alias incorrectly (e.g., sending an email to an alias email address that is not associated with the company), appear to be sharing personal information with other companies (e.g., because a second company has used an email alias associated with the first company), etc. The user may also be able to set filtering preferences for the companies in particular, or more generally for any company that misuses an alias or appears to be sharing personal information. Thus, the content providing engine 606 can act as an identity-compromised warning system. In a specific implementation, the system 600 can have a centralized content providing engine associated with multiple users that, without sharing information between users, can identify identity-compromising trends and alert other users so that they can be proactive regarding an identity-compromising risk.

In the example of FIG. 6, the ecommerce analysis module 616 is coupled to the content providing engine 606. The content providing engine 606 can use the module to analyze emails from an ecommerce site associated with user purchases, provide historical buying habits and amounts in a convenient format, or the like.

In the example of FIG. 6, the market place module 618 is coupled to the content providing engine 606. The content providing engine 606 can use the module to empower a user to treat the user's personal information as an asset. For example, the module can facilitate selling personal data or statistical data in the user profile, viewing offers for personal or statistical data, managing engagements with third party entities to which the user has given personal information, or the like.

The cost of acquiring personal information from users will likely depend upon the level of acceptance. Factors can include: whether a user agrees to enter a relationship with an entity and give some personal data; whether a user agrees to be targeted (advertising) based on his behavior; whether a user agrees to be targeted according to his location (mobile); whether a user communicates more personal information (interests, hobbies, . . . ); or the like.

For third party entities, the Market Place would enable them to offer qualified contacts search, such as, for example, "I am looking for women 20 to 25 year old from London who are interested in . . . ." In a particular implementation, the third party entities can pay the controlled data management system per qualified contact depending on the level of personal data shared by the individual and his commitment, and the country. This payment is only related to recruitment and does not include the payment/offer proposed by the company in exchange for, e.g., user participation in a study, additional personal information, jobs, etc. It may be desirable for the controlled data management system to stay out of the middle of a relationship between a user and a third party entity. In the case of a user profile's auction (personal or statistical data), the company wishing to access this auction place may have to pay a monthly subscription of €y.

The controlled data management system can, for example, give back X % recruitment fee to users who are paying for services. The math for the X % can depend, for example, on the level of individual monthly charge, such as 50% if the user is paying under $2 per month, 70% if he's paying between $2 and $5 a month, and 90% if he's paying more than $5 a month. These numbers are provided by way of example only.

In the example of FIG. 6, the product search module 620 is coupled to the content providing engine 606. The content providing engine 606 can use the module to facilitate product searches with a search engine, use historical data to recommend similar products to those that have been purchased before, make price comparisons, or the like. Advantageously, the system 600 can use certain of the user's preferences and personal data to gather data on products or solicit offers using a temporary alias that ceases to be used after a time period set by the user. The content providing engine 606 can also use the module to set up a "Promotions Place" where the user can go to view promotions and have control over the promotions that are displayed. In a specific implementation, the personal page of a user is free of advertising except in the Market Place and the Promotions Place. However, in an alternative, the promotions could be displayed on a user's personal page.

In the product search arena, a search engine will allow users to receive current promotions (banners or sponsored links) according to criteria they have entered (products, types of specific products, etc.) including a time (interest from . . . to . . . ). There could be some restrictions regarding from whom the users want to receive advertising and/or promotions (only favorite brands, those recommended by the user community, etc.). Advertisers/brands will pay to be positioned in the search and promote their products and the value will be higher as the target will be confident and in control.

Controlled data management system users can be compensated for subscribing to a paid service X % (or some other amount) of what an entity has paid to the controlled data management system to be on the search results or has paid for acquisition of customer data. Thus, a user can be compensated for providing personal information. The math for the X % can depend, for example, on the level of individual monthly charge. These numbers are provided by way of example only.

In the example of FIG. 6, the enter preferences module 622 is coupled to the content providing engine 606. The content providing engine 606 can use the module to receive preferences from the user regarding any actions or choices not described previously.

One or more of the modules can have parts that are free to users and parts that are paid-for. In a specific implementation, the user can get additional services for sharing personal information. Alternatively, the user could simply be paid for sharing the personal information. An example of what could be provided for free in a particular implementation includes a data sharing transparency engine on a user machine facilitating: automatic data collection for registered email address(es) of registered users, data storage, email management, generation of enterprise-specific email aliases, routing email sent to the alias to the user's personal address, information (e.g., use of cookies, average rates, color-coding of sites based on controlled data management certification, community feedback, etc.).

An example of what could be provided for free in a particular implementation includes a controlled data sharing server facilitating: registration of users; access to process downloads; access to a list of data holders; access to what personal information is held by each of a list of data holders; access to subscriptions to recurrent newsletters, mailing lists, or the like; access to whether a site uses cookies or other tracking devices and why; access to a link to go to a profile management page; access to a testimonial page to rate sites in terms of trust, reputation, appreciation, quality of site, etc.; access to the aggregate rate of testimonials based on controlled data management member input; access to entity lists of entities that are apparently sharing personal information or using an alias that was not assigned to them.

An example of what could be provided for a fee in a particular implementation includes a data sharing transparency engine on a user machine that facilitates user and password management for a family or group. This can enable the system to provide aggregated information on spending, buying habits, or the like for the family or group.

An example of what could be provided for a fee in a particular implementation includes a controlled data sharing server facilitating: stopping receipt of information from one or more entities; asking an entity to delete a profile (possibly excluding relationships for which the profile is required, such as banks, Internet providers, mobile operators, etc.), though the system will not necessarily be capable of enforcing deletion of a profile at an entity unless the entity consents; viewing the aggregate rate of reputation/appreciation based on community input; allowing one or more sites to track behavior for advertising or other in accordance with user preferences, and possibly including having the entity compensate the user for allowing them to track behavior; analyzing ecommerce email transactions with detail synthesis of purchases per week, month, year, type of product, brand, etc.; providing a household view of expenses including consolidation of emails under a family nickname if each member uses an email alias for ecommerce sites; allowing parents to obtain information on where their children have given personal data and what they have disclosed.

Known or convenient payment systems, perhaps through third parties, could be employed to enable users to pay for services or to be credited for sale of their personal or statistical information. It is also possible to charge and credit users on their mobile accounts, probably through mobile operators.

It may be desirable to partner with third parties such as mobile service providers so that they would offer those services to their Mobile/Internet Subscribers. Indeed, this type of service would be of value to the operators at least because it would allow them to strengthen their image in the "touchy" arena of privacy while allowing them to collect additional revenues associated with value added services.

Those services would then be directly charged on individuals mobile phones bills and there could be a revenue share between the controlled data management system and the operators. On the other hand, for a compensation mechanism that would allow to credit the individual on his mobile account when he will sell is his personal data, the net result between Paid services and Personal data sales would appear as a "+" or "−" on his mobile phone bill. This could mean that the controlled data management system might not have to store or manage bank details of users and would definitely make sense for people who don't have a bank account but have a mobile phone bill.

Figure 7A:
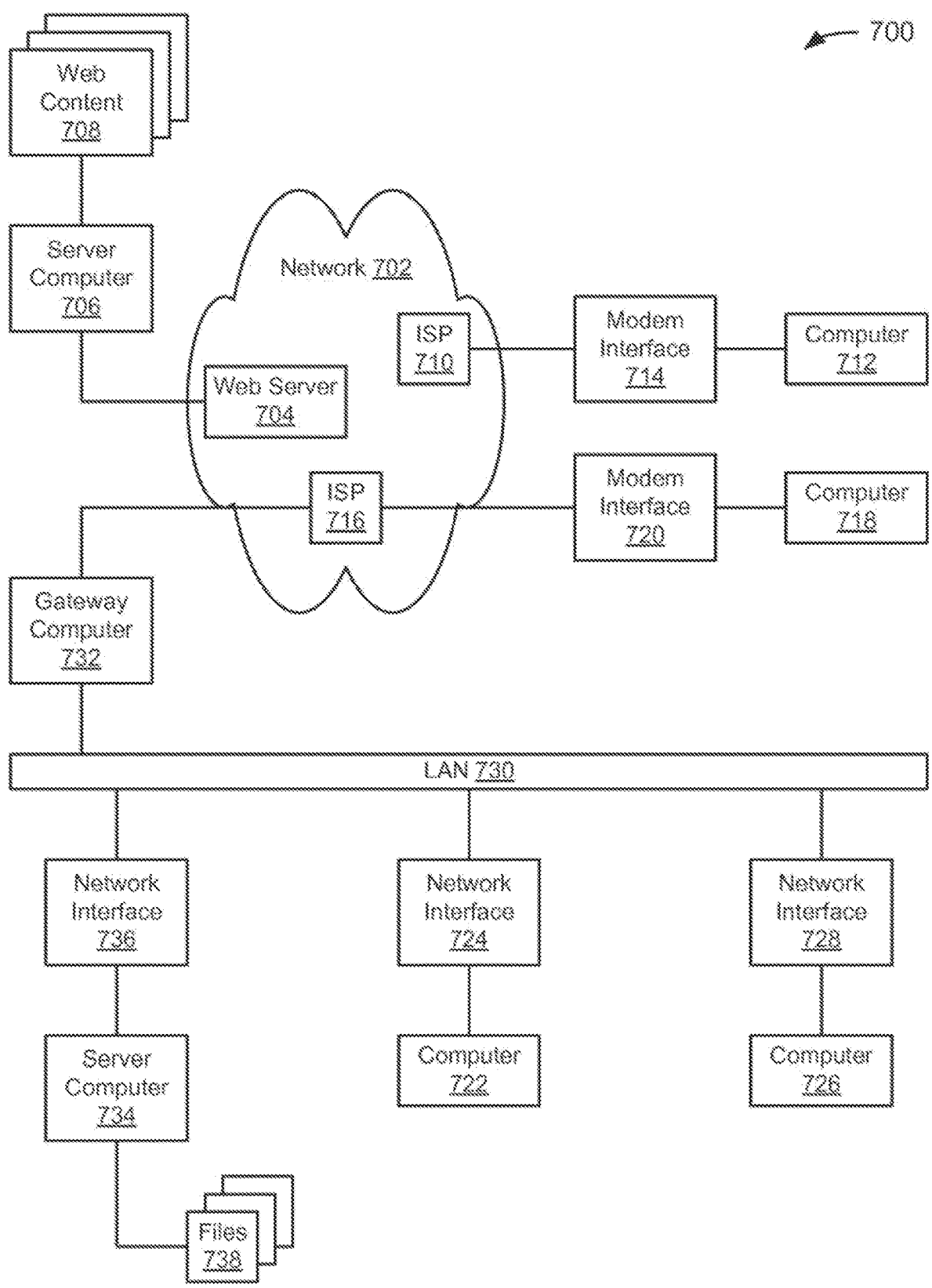
FIGS. 7A and 7B depict examples of components suitable for performing the techniques described in this paper.
Figure 7B:
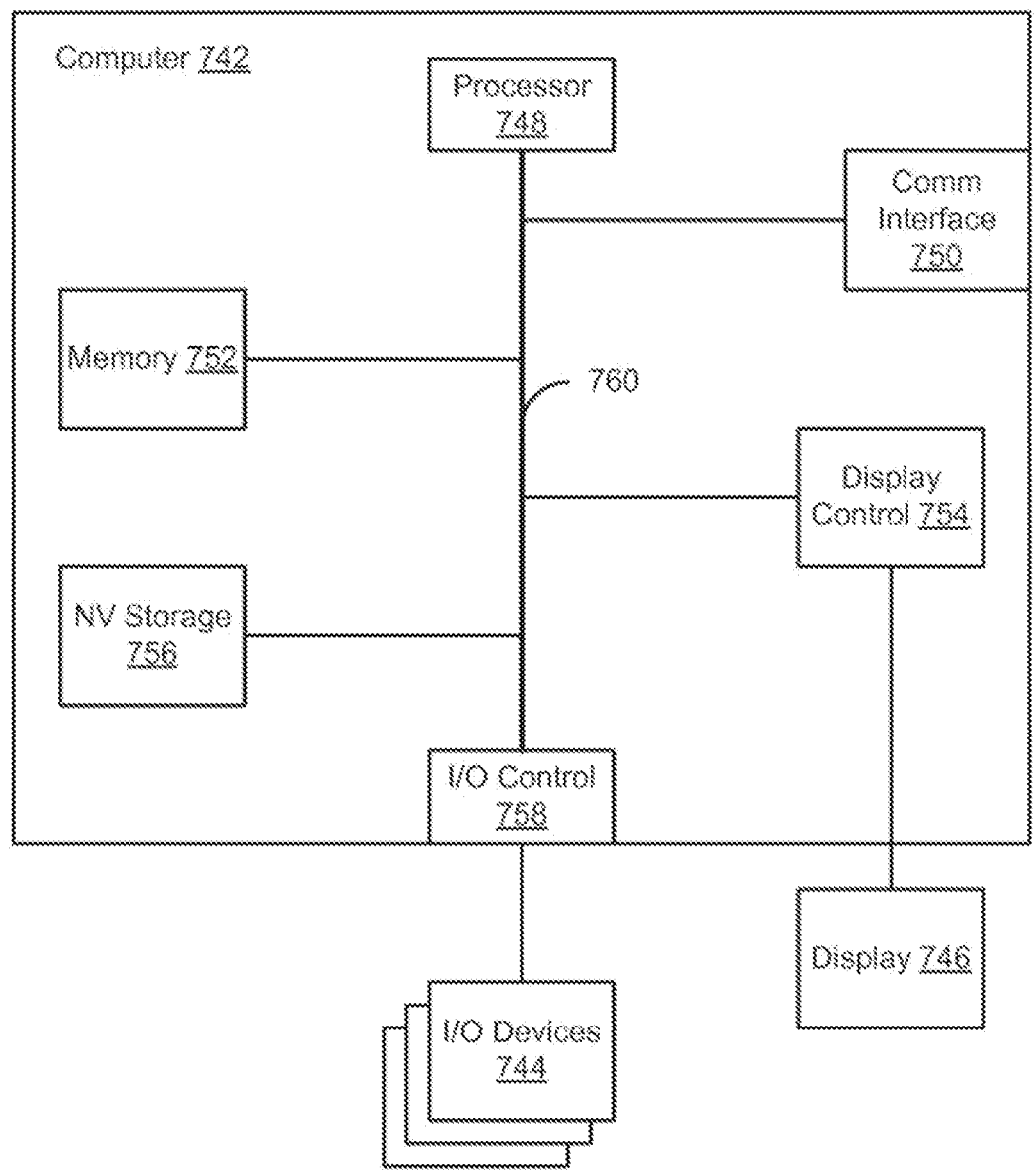

The following description of FIGS. 7A and 7B is intended to provide an overview of computer hardware and other operating components suitable for performing the techniques described in this paper. The computer hardware and other operating components may be suitable as part of the apparatuses implementing the techniques described in this paper. The techniques can be practiced with other computer system configurations, including hand-held devices, multiprocessor systems, microprocessor-based or programmable consumer electronics, network PCs, minicomputers, mainframe computers, wireless devices, and the like. The techniques can also be practiced in distributed computing environments where tasks are performed by remote processing devices that are linked through a communications network.

FIG. 7A depicts a system on which a framework for controlled data management system can be implemented.

FIG. 7A depicts a networked system 700 that includes several computer systems coupled together through a network 702, such as the Internet. The term "Internet" as used herein refers to a network of networks which uses certain protocols, such as the TCP/IP protocol, and possibly other protocols such as the hypertext transfer protocol (HTTP) for hypertext markup language (HTML) documents that make up the World Wide Web (the web). The physical connections of the Internet and the protocols and communication procedures of the Internet are well known to those of skill in the relevant art.

The web server 704 is typically at least one computer system that operates as a server computer system and is configured to operate with the protocols of the world wide web and is coupled to the Internet. The web server system 704 can be a conventional server computer system. Optionally, the web server 704 can be part of an ISP which provides access to the Internet for client systems. The web server 704 is shown coupled to the server computer system 706 which itself is coupled to web content 708, which can be considered a media data store. While two computer systems 704 and 706 are shown in FIG. 7A, the web server system 704 and the server computer system 706 can be one computer system having different software components implemented on hardware and providing the web server functionality and the server functionality provided by the server computer system 706, which will be described further below.

Access to the network 702 is typically provided by Internet service providers (ISPs), such as the ISPs 710 and 716. It is also possible to use Mobile and Mobile Network operators that deliver fixed Internet connections. In the case of Mobile, access to the Internet is often through 3G, 4G, GPRS, EDGE, etc. Also, Wifi is a way to access the Internet that is provided differently. A person of skill in the relevant art will recognize that known and convenient ways to access the Internet can be used. Users on client systems, such as client computer systems 712, 718, 722, and 726 obtain access to the Internet through the ISPs 710 and 716. Access to the Internet allows users of the client computer systems to exchange information, receive and send e-mails, and view documents, such as documents which have been prepared in the HTML format. These documents are often provided by web servers, such as web server 704, which are referred to as being "on" the Internet. Often these web servers are provided by the ISPs, such as ISP 710, although a computer system can be set up and connected to the Internet without that system also being an ISP. In the case of Mobile, sometimes an application server, rather than a Web Server is used, and this may be the case for PC applications, such as iTunes, games, etc. that are not using any web server nor a browser. A person of skill in the relevant art will recognize that applications are increasing and can use known or convenient technologies to obtain documents.

Client computer systems 712, 718, 722, and 726 can each, with the appropriate web browsing software, view HTML pages provided by the web server 704. The ISP 710 provides Internet connectivity to the client computer system 712 through the modem interface 714, which can be considered part of the client computer system 712. A person of skill in the relevant art will recognize that the connection mechanisms, such as modem interface 714, can be modified or replaced with known or convenient technologies to make use of various networks, such as GPRS, EDGE, 3G, 4G, etc. The client computer system can be a personal computer system, a network computer, a web TV system, or other computer system. While FIG. 7A shows the modem interface 714 generically as a "modem," the interface can be an analog modem, isdn modem, cable modem, satellite transmission interface (e.g. "direct PC"), or other interface for coupling a computer system to other computer systems.

Similar to the ISP 714, the ISP 716 provides Internet connectivity for client systems 718, 722, and 726, although as shown in FIG. 7A, the connections are not the same for these three computer systems. Client computer system 718 is coupled through a modem interface 720 while client computer systems 722 and 726 are part of a LAN 730.

Client computer systems 722 and 726 are coupled to the LAN 730 through network interfaces 724 and 728, which can be Ethernet or other network interfaces. The LAN 730 is also coupled to a gateway computer system 732 which can provide firewall and other Internet-related services for the local area network. This gateway computer system 732 is coupled to the ISP 716 to provide Internet connectivity to the client computer systems 722 and 726. The gateway computer system 732 can be a conventional server computer system.

Alternatively, a server computer system 734 can be directly coupled to the LAN 730 through a network interface 736 to provide files 738 and other services to the clients 722 and 726, without the need to connect to the Internet through the gateway system 732.

FIG. 7B depicts a computer system 740 for use in the system 700 (FIG. 7A). The computer system 740 may be a conventional computer system that can be used as a client computer system or a server computer system or as a web server system. Such a computer system can be used to perform many of the functions of an Internet service provider, such as ISP 710 (FIG. 7A).

In the example of FIG. 7B, the computer system 740 includes a computer 742, I/O devices 744, and a display device 746. The computer 742 includes a processor 748, a communications interface 750, memory 752, display controller 754, non-volatile storage 756, and I/O controller 758. The computer system 740 may be couple to or include the I/O devices 744 and display device 746.

The computer 742 interfaces to external systems through the communications interface 750, which may include a modem or network interface. It will be appreciated that the communications interface 750 can be considered to be part of the computer system 740 or a part of the computer 742. A computer can include Mobile and any other connected device that has a processor. The communications interface can be an analog modem, ISDN modem, cable modem, token ring interface, satellite transmission interface (e.g. "direct PC"), or other interfaces for coupling a computer system to other computer systems.

The processor 748 may be, for example, a conventional microprocessor such as an Intel Pentium microprocessor or Motorola power PC microprocessor, or some other conventional or unconventional processor. The memory 752 is coupled to the processor 748 by a bus 760. The memory 752 can be dynamic random access memory (DRAM) and can also include static ram (SRAM). The bus 760 couples the processor 748 to the memory 752, also to the non-volatile storage 756, to the display controller 754, and to the I/O controller 758.

The I/O devices 744 can include a keyboard, disk drives, printers, a scanner, and other input and output devices, including a mouse or other pointing device. The display controller 754 may control in the conventional manner a display on the display device 746, which can be, for example, a cathode ray tube (CRT) or liquid crystal display (LCD). The display controller 754 and the I/O controller 758 can be implemented with applicable known or convenient technology.

The non-volatile storage 756 is often a magnetic hard disk, an optical disk, or another form of storage for large amounts of data. Some of this data is often written, by a direct memory access process, into memory 752 during execution of software in the computer 742. Objects, methods, inline caches, cache states and other object-oriented components may be stored in the non-volatile storage 756, or written into memory 752 during execution of, for example, an object-oriented software program. In this way, the components illustrated in, for example, FIGS. 1-6 can be instantiated on the computer system 740.

The computer system 740 is one example of many possible computer systems which have different architectures. For example, personal computers based on an Intel microprocessor often have multiple buses, one of which can be an I/O bus for the peripherals and one that directly connects the processor 748 and the memory 752 (often referred to as a memory bus). The buses are connected together through bridge components that perform any necessary translation due to differing bus protocols.

Network computers are another type of computer system that can be used to implement techniques described in this paper. Network computers do not usually include a hard disk or other mass storage, and the executable programs are loaded from a network connection into the memory 752 for execution by the processor 748. A Web TV system is also considered to be a computer system, but it may lack some of the features shown in FIG. 7B, such as certain input or output devices. A typical computer system will usually include at least a processor, memory, and a bus coupling the memory to the processor.

In addition, the computer system 740 is controlled by operating system software which includes a file management system, such as a disk operating system, which is part of the operating system software. One example of an operating system software with its associated file management system software is the family of operating systems known as Windows® from Microsoft Corporation of Redmond, Washington, and their associated file management systems. Another example of operating system software with its associated file management system software is the Linux operating system and its associated file management system. The file management system is typically stored in the non-volatile storage 756 and causes the processor 748 to execute the various acts required by the operating system to input and output data and to store data in memory, including storing files on the non-volatile storage 756.

Figure 8A:
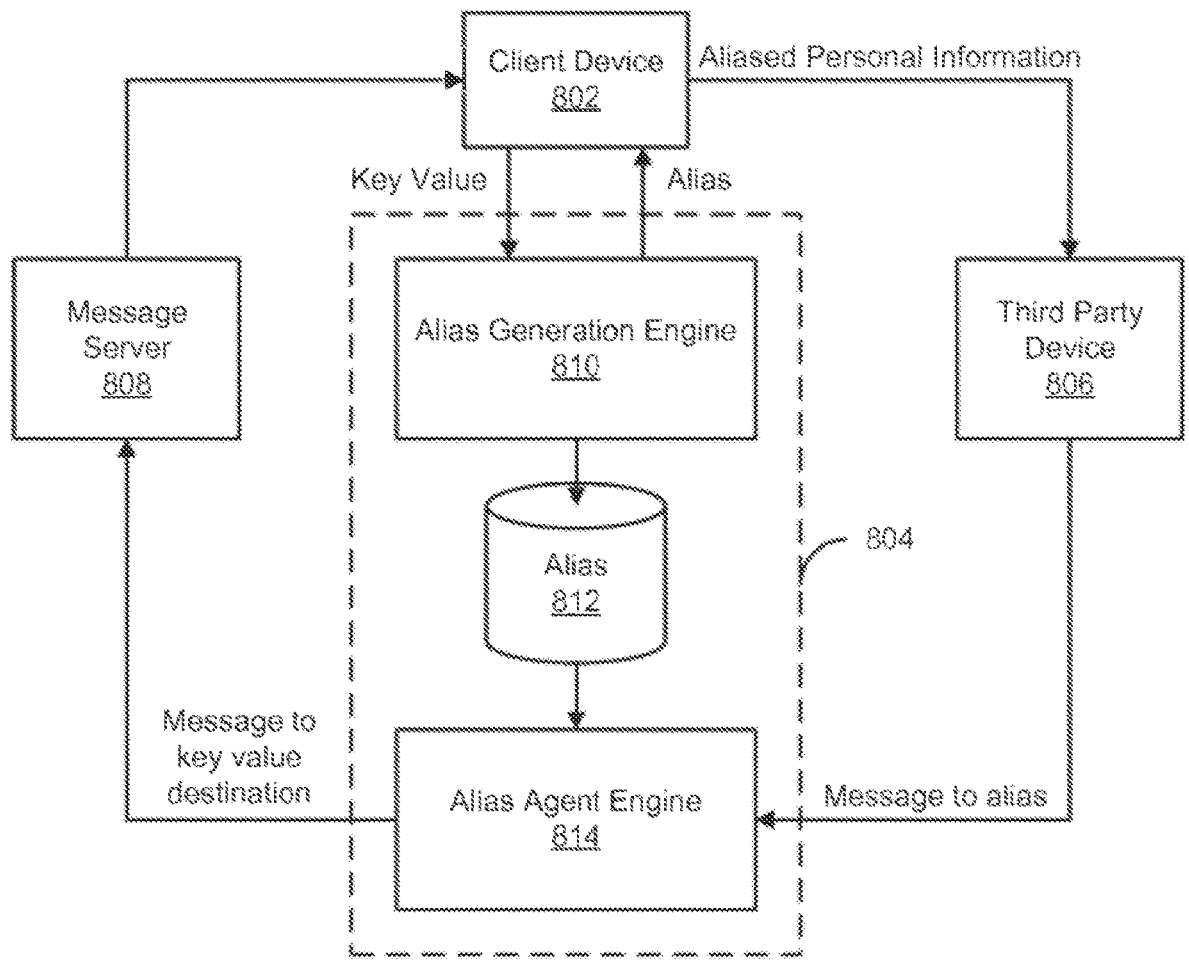
FIGS. 8A to 8C depict examples of aliasing systems with variations in the locality of the components.
Figure 8B:
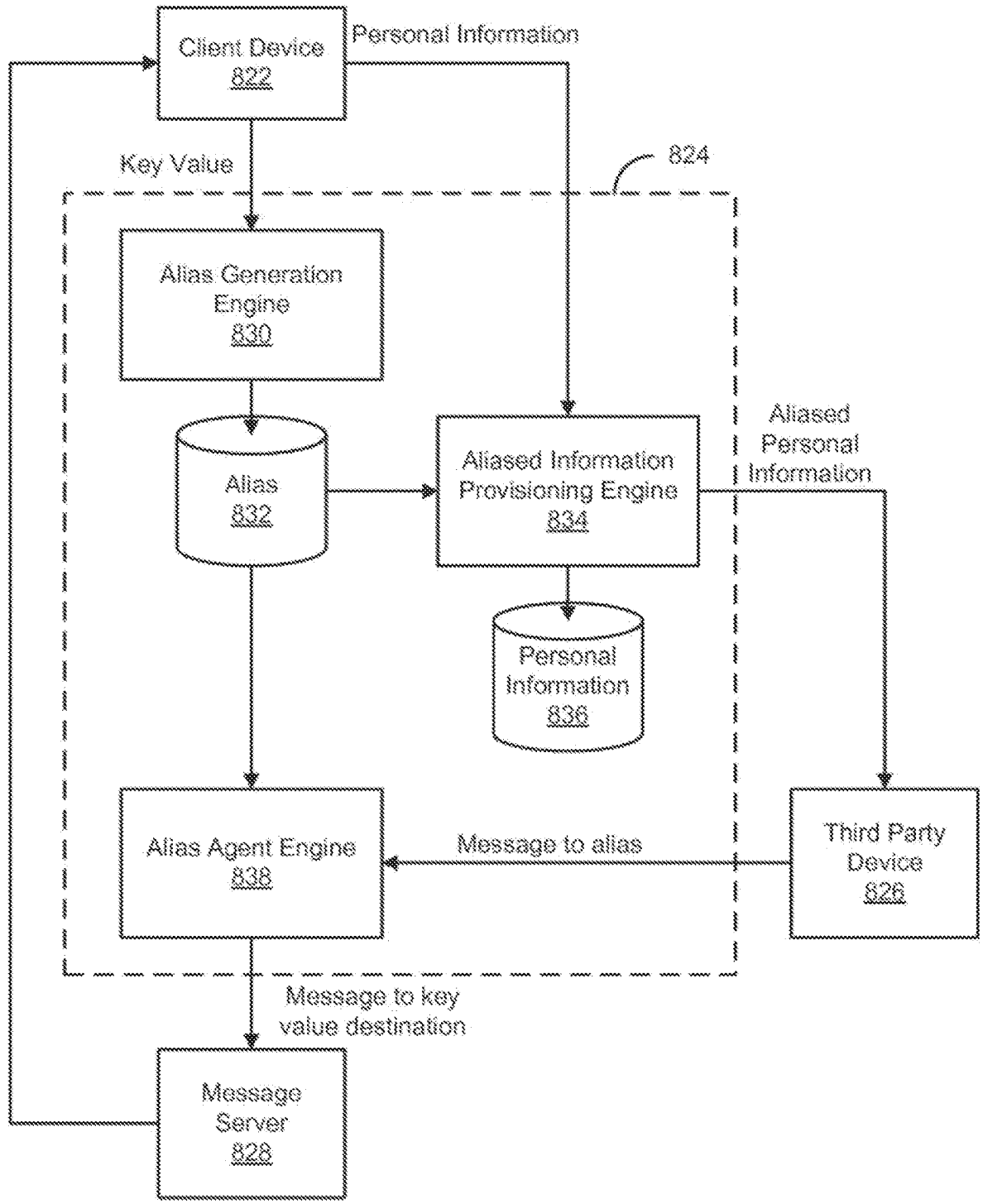
Figure 8C:
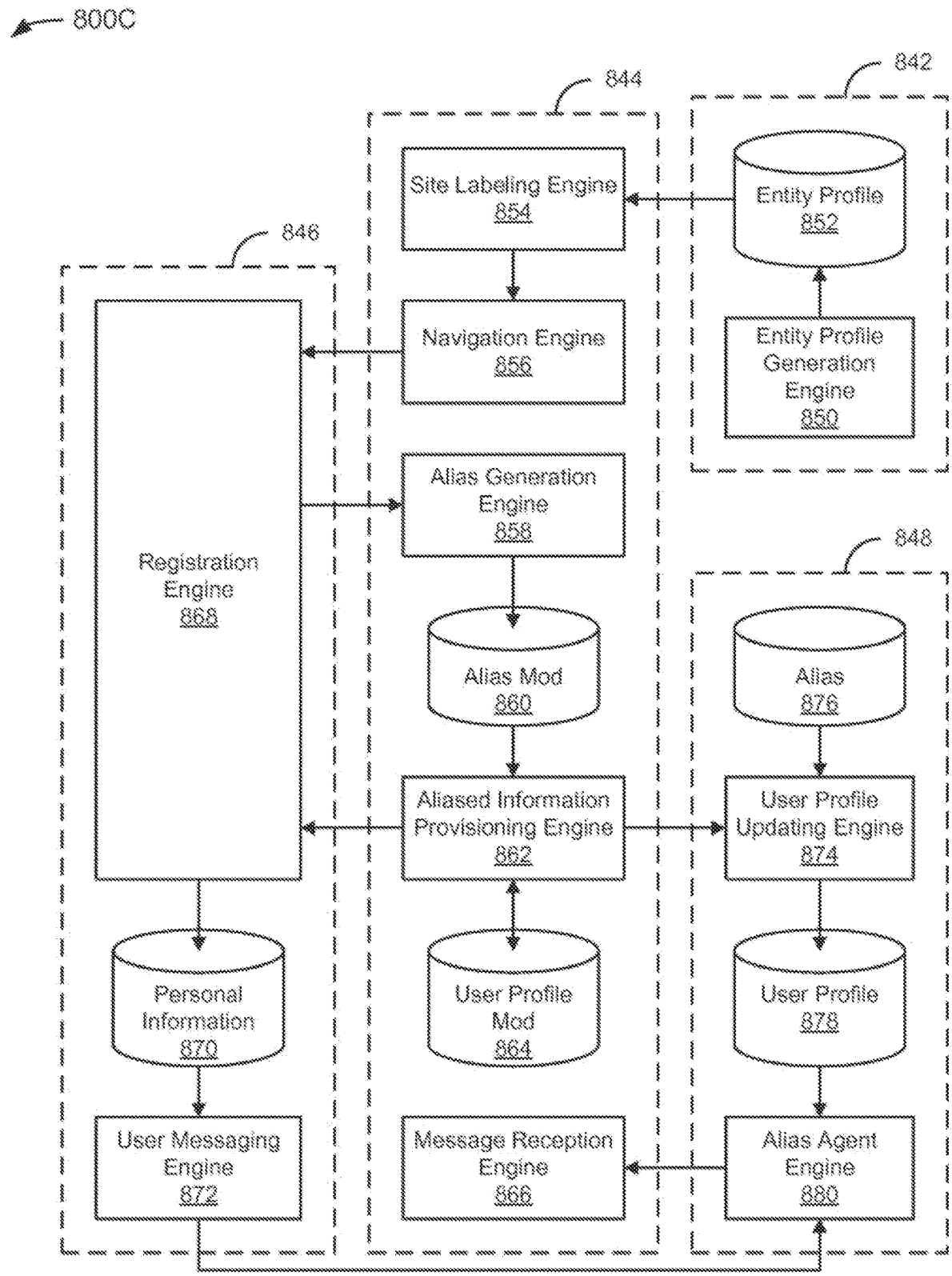

FIGS. 8A to 8C depict examples of aliasing systems 800A to 800C with variations in the locality of the components. In the example of FIG. 8A, the system 800A includes a client device 802, a controlled data management system 804, a third party device 806, and a message server 808. In the example of FIG. 8A, the client device 802 is coupled to the controlled data management system 804, the third party device 806, and the message server 808. The client device 802 is association with a user that has associated personal information, and can be similar to the master client 106 of FIG. 1.

In the example of FIG. 8A, the controlled data management system 804 includes an alias generation engine 810, an alias data store 812, and an alias agent engine 814. In the example of FIG. 8A, the alias generation engine 810 is coupled to the client device 802 and the alias agent engine 814 is coupled to the third party device 806 and the message server 808. The alias generation engine 810 can generate an alias from a key value. In the example of FIG. 8A, the client device 802 provides the key value, which can include a contact value such as an email address or a phone number, to the alias generation engine 810; the alias generation engine 810 generates an alias from the key value, which is stored in the alias data store 812 and also provided to the client device 802. The alias is specific to an entity that is associated with the third party device 806. The alias agent engine 814 can receive a message to the alias and change the contact value of the alias to the key value.

In the example of FIG. 8A, the client device 802 or an associated device receives the alias from the alias generation engine 810 and provides at least the alias, and potentially other personal information, such as a userid, password, or other data, to the third party device 806. Regardless of whether other personal information is included, the data provided to the third party device 806 can be referred to as aliased personal information because it includes at least the alias.

In the example of FIG. 8A, the third party device 806 receives the aliased personal information. Presumably the third party device 806 will store some or all of the aliased personal information in a data store (not shown). Since the alias includes a contact value, the third party device 806, or an associated device, can use the alias to send a message to a user associated with the client device 802. In the example of FIG. 8A, the third party device 806 sends a message to the alias, which is received at the alias agent engine 814.

In the example of FIG. 8A, the alias agent engine 814 uses the alias data store 812 to find a key value associated with the alias for the message sent from the third party device 806 or an associated device to the alias. The alias agent engine 814 can provide additional information in the message, such as the source of the message to the alias. Since the alias is entity-specific, if the source of the message to the alias is from an entity that is not associated with the third party device, then the alias agent engine 814 can determine that the alias was used by an entity other than the one to which the alias was provided in the aliased personal information. The alias agent engine 814 can include in a message to the key value destination that the alias was used by an entity other than the entity for which the alias was generated. In a specific implementation, the alias agent engine 814 can take action, such as filtering the message, in accordance with user preferences.

In the example of FIG. 8A, the message server 808 is coupled to the client device 802 and the alias agent engine 814. In the example of FIG. 8A, the message server 808 receives the message to the key value destination that was sent by the alias agent engine 814. The message to the key value destination can then be sent to the client device 802 or an associated device. A user can compare the source of the message to the alias, or the information that is added to the message to the key value destination regarding the source of the message to the alias. In this way, the user can determine whether the entity that sent the message to the alias is the entity that is associated with the alias, and take action as the user deems appropriate.

Advantageously, the system 800A can accomplish controlled data management with relatively little personal information stored at the controlled data management system 804. At a minimum, the controlled data management system 804 can maintain only the key value and any entity-specific aliases that are generated for the key value. It is likely that the controlled data management system 804 will include some other information, such as a user name and password for the user associated with the client device 802, to enable the user to manage a controlled data management account, but this is not absolutely necessary for the functionality described.

FIG. 8B depicts an example of a system 800B that stores somewhat more personal information at a controlled data management system. In the example of FIG. 8B, the system 800B includes a client device 822, a controlled data management system 824, a third party device 826, and a message server 828. In the example of FIG. 8B, the client device 822 is coupled to the controlled data management system 824, the third party device 826, and the message server 828. The client device 822 is association with a user that has associated personal information, and can be similar to the master client 106 of FIG. 1.

In the example of FIG. 8B, the controlled data management system 824 includes an alias generation engine 830, an alias data store 832, an aliased information provisioning engine 834, a personal information data store 836, and an alias agent engine 838. In the example of FIG. 8B, the alias generation engine 830 is coupled to the client device 822; the alias data store 832 is coupled to the alias generation engine 830, the aliased information provisioning engine 834, and the alias agent engine 838; the aliased information provisioning engine 834 is coupled to the client device 822, the personal information data store 836, and the third party device 826; and the alias agent engine 838 is coupled to the third party device 826 and the message server 828.

The alias generation engine 830 can generate an alias from a key value. In the example of FIG. 8B, the client device 822 provides the key value, which can include a contact value such as an email address or a phone number, to the alias generation engine 820; the alias generation engine 820 generates an alias from the key value, which is stored in the alias data store 832. The alias is specific to an entity that is associated with the third party device 826. The aliased information provisioning engine 834 can receive personal information from the client device 822 or an associated device and store the personal information in the personal information data store 836. The aliased information provisioning engine 834 can also use the alias in the alias data store and personal information provided by the client device 822 and/or that is stored in the personal information data store 836 to generate aliased personal information appropriate for provisioning to an entity that is associated with the alias. The alias agent engine 838 can receive a message to the alias and change the contact value of the alias to the key value.

In the example of FIG. 8B, the aliased information provisioning engine 834 obtains the alias from the alias data store 832 and potentially other personal information, such as a userid, password, or other data, from the client device 822 and/or the personal information data store 836 and provides aliased personal information to the third party device 826. Regardless of whether other personal information is included, the data provided to the third party device 826 can be referred to as aliased personal information because it includes at least the alias.

In the example of FIG. 8B, the third party device 826 receives the aliased personal information. Presumably the third party device 826 will store some or all of the aliased personal information in a data store (not shown). Since the alias includes a contact value, the third party device 826, or an associated device, can use the alias to send a message to a user associated with the client device 822. In the example of FIG. 8B, the third party device 826 sends a message to the alias, which is received at the alias agent engine 838.

In the example of FIG. 8B, the alias agent engine 838 uses the alias data store 832 to find a key value associated with the alias for the message sent from the third party device 826 or an associated device to the alias. The alias agent engine 838 can provide additional information in the message, such as the source of the message to the alias. Since the alias is entity-specific, if the source of the message to the alias is from an entity that is not associated with the third party device, then the alias agent engine 838 can determine that the alias was used by an entity other than the one to which the alias was provided in the aliased personal information. The alias agent engine 838 can include in a message to the key value destination that the alias was used by an entity other than the entity for which the alias was generated. In a specific implementation, the alias agent engine 838 can take action, such as filtering the message, in accordance with user preferences.

In the example of FIG. 8B, the message server 828 is coupled to the client device 822 and the alias agent engine 838. In the example of FIG. 8B, the message server 828 receives the message to the key value destination that was sent by the alias agent engine 838. The message to the key value destination can then be sent to the client device 822 or an associated device. A user can compare the source of the message to the alias, or the information that is added to the message to the key value destination regarding the source of the message to the alias. In this way, the user can determine whether the entity that sent the message to the alias is the entity that is associated with the alias, and take action as the user deems appropriate.

FIG. 8C depicts an example of a system 800C that includes a data sharing transparency engine at a client device. In the example of FIG. 8C, the system 800C includes an entity profiling system 842, client device 844, a third party system 846, and a controlled data management system 848. A message server (not shown) could also be coupled between the client device 844 and the controlled data management system 848 (see, e.g., FIGS. 8A and 8B).

In the example of FIG. 8C, the entity profiling system 842 includes an entity profile generation engine 850 and an entity profile data store 852. The entity profile generation engine 850 is capable of generating a profile for an entity by receiving information from the entity when the entity subscribes to a service, by searching for publicly available information about the entity, by receiving information from users about the entity, or through some other convenient procedure. The entity profile generation engine 850 can store relevant information about the entity in the entity profile data store 852. In a specific implementation, some or all of the entity profile data store 852 can be located on the client device 844 (not shown).

In the example of FIG. 8C, the client device 844 includes a site labeling engine 854, a navigation engine 856, an alias generation engine 858, an alias mod data store 860, an aliased information provisioning engine 862, a user profile mod data store 864, and a message reception engine 866. In the example of FIG. 8C, the site labeling engine 854 is coupled to the entity profile data store 852 and the navigation engine 856; the navigation engine 856 is coupled to the third party system 846; the alias generation engine 858 is coupled to the third party system 846 and the alias mod data store 860; the aliased information provisioning engine 862 is coupled to the third party system 846, the alias mod data store 860, the user profile mod data store 864, and the controlled data management system 848; and the message reception engine is coupled to the controlled data management system 848.

The site labeling engine 854 can use data about an entity from the entity profile data store 852 to provide a user information about the entity. When the information is provided within a device that is currently viewing a location of an entity, such as a website associated with the entity, the information can be characterized as a label. Labels can indicate whether an entity is known to the controlled data management system, declines to participate in controlled data management, shares personal information with affiliates or other parties, is a controlled data management system subscriber, or other information that is deemed appropriate. The navigation engine 856 can (virtually) affix the label to a location of the entity, such as by providing a menu option in a browser that, when chosen, displays information about the entity, as a label that is automatically inserted in the browser when navigating to a website associated with the entity, or in some other manner that makes information about the entity, if any, available to a user.

The alias generation engine 858 can generate an alias that is specific to an entity. In the example of FIG. 8C, the alias generation engine 858 stores the alias in the alias mod data store 860. The alias mod data store 860 may or may not include only a subset of aliases known to a user. A reason that not all aliases are needed is that the alias modifications can be provided to the controlled data management system 848, which can intercept messages directed to the alias and provide relevant information associated with, for example, the source of the information. However, it is also possible to maintain all aliases in the alias mod data store 860, which would mean that instead of an alias "mod" data store, the data store could be referred to as an alias data store, which, for a specific user profile, the alias information at the client device 844 and the controlled data management system 848 could be the same. In an implementation in which all alias information is maintained at the client device 844, the message reception engine 866 can be coupled to the alias data store, and generate information associated with the alias similar to that generated at the controlled data management system 848.

The aliased information provisioning engine 862 can receive personal information from a user through an input device, from the user profile mod data store 864, or from some other personal information source. When the aliased information provisioning engine 862 obtains new or updated information, the personal information can be stored in the user profile mod data store 864. The user profile mod data store 864 is a "mod" data store because the aliased information provisioning engine 862 can provide the information to the controlled data management system 848. Alternatively, the personal information can be maintained at the client device 844 and not shared, or only a subset might be shared, with the controlled data management system 848. The aliased information provisioning engine 862 can use the alias in the alias mod data store 860 and personal information obtained and/or that is stored in the personal information data store 864 to generate aliased personal information appropriate for provisioning to an entity that is associated with the alias. The aliased information provisioning engine 862 can also update the controlled data management system 848 with alias and/or user profile data, depending upon the implementation, configuration, and/or user preferences.

The message reception engine 866 can receive messages that were directed to an alias. The messages may or may not be addressed to the alias when received at the message reception engine 866. For example, the controlled data management system 848 may be able to replace the alias with a destination address of the user. In a specific implementation, the message reception engine 866 can analyze the message to determine whether the alias used by the source of the message is specific to the entity that is the source of the message. Where an alias that is not specific to an entity is used by that entity, the message reception engine 866 can indicate to the user that the alias was not used by the entity to which the alias was assigned, which may be indicative of data sharing.

In the example of FIG. 8C, the third party system 846 includes a registration engine 868, a personal information data store 870, and a user messaging engine 872. In the example of FIG. 8C, the registration engine 868 is coupled to the navigation engine 856, the alias generation engine 858, the aliased information provisioning engine 862, and the personal information data store 870. The registration engine 868 can provide a data entry form to a user, such as on a web page, that is displayed by the navigation engine 856. The registration engine 868 can also use email, text messages, or some other contact technique to initiate registration of a user. As used in this paper, registration of a user is intended to broadly include both explicit registration on a site associated with an entity, providing information for any reason, or extracting information from a user with or without the user's knowledge. It would be desirable to make the user as aware of the registration techniques as possible within technological or informational constraints.

When the registration engine 868 attempts to obtain contact information from a user, the alias generation engine 858 can generate an alias for use instead of the contact information. For example, if the registration engine 868 obtains email addresses as part of a registration procedure, the alias generation engine 858 can generate an alias email address. The registration engine 868 then receives aliased information from the aliased information provisioning engine 862. Regardless of whether other personal information is included, the data received at the registration engine 868 can be referred to as aliased personal information because it includes at least the alias. The registration engine 868 can store the aliased personal information in the personal information data store 870. Since the alias includes a contact value, the user messaging engine 872 can use the alias to send a message to a user associated with the client device 844. In the example of FIG. 8C, the user messaging engine 872 sends a message to the alias, which is received at the alias agent engine 880.

The alias agent engine 880 can provide additional information in the message, such as the source of the message to the alias. Since the alias is entity-specific, if the source of the message to the alias is from an entity that is not associated with the third party device, then the alias agent engine 880 can determine that the alias was used by an entity other than the one to which the alias was provided in the aliased personal information. The alias agent engine 880 can include in a message to the key value destination that the alias was used by an entity other than the entity for which the alias was generated. In a specific implementation, the alias agent engine 880 can take action, such as filtering the message, in accordance with user preferences. In an alternative, the message to the alias could be received at the message reception engine 866, bypassing the alias agent engine 880, and the message reception engine 866 could carry out functionality similar to that described for the alias agent engine 880.

Advantageously, a user can compare the source of the message to the alias, or the information that is added to the message to the key value destination regarding the source of the message to the alias. In this way, the user can determine whether the entity that sent the message to the alias is the entity that is associated with the alias, and take action as the user deems appropriate.

Figure 9:
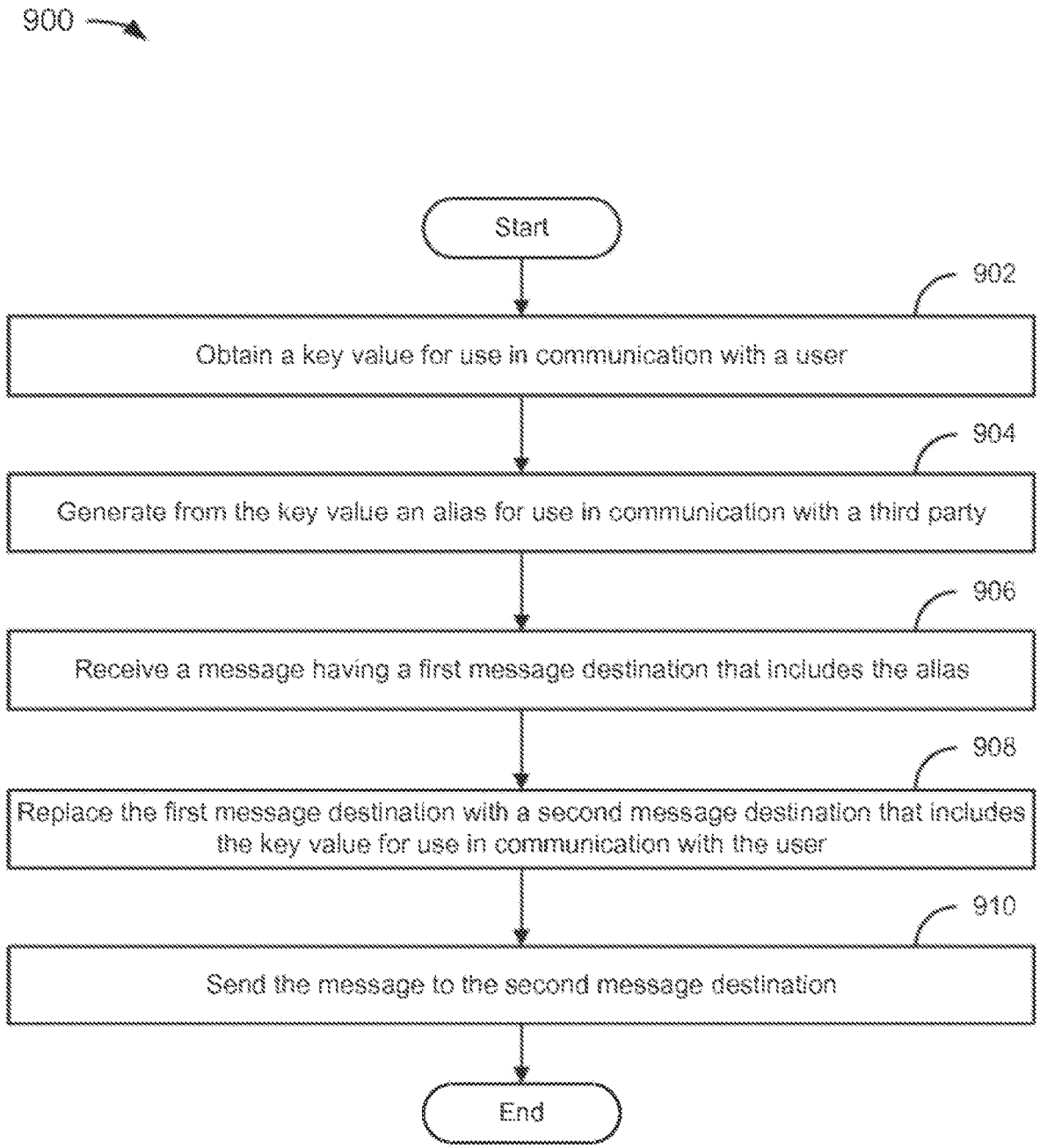
FIG. 9 depicts a flowchart of an example of a method for identifying information sharing using an entity-specific alias.

FIG. 9 depicts a flowchart 900 of an example of a method for identifying information sharing using an entity-specific alias. In the example of FIG. 9, the flowchart 900 starts at module 902 with obtaining a key value for use in communication with a user. The key value can include, for example, an email address, a phone number, an address, or another applicable contact value.

In the example of FIG. 9, the flowchart 900 continues to module 904 with generating from the key value an alias for use in communication with a third party. The alias can be in a format similar to that of the key value. For example, if the key value is an email address, the alias can also be an email address. The alias is intended to replace the key value in communications between a user and an entity (or entities) for which the alias is created.

In the example of FIG. 9, the flowchart 900 continues to module 906 with receiving a message having a first message destination that includes the alias. This is indicative of a message that was sent by an entity using the alias.

In the example of FIG. 9, the flowchart 900 continues to module 908 with replacing the first message destination with a second message destination that includes the key value for use in communication with the user. It may be desirable to include the first message destination (alias) in some form. For example, the alias could be put into the cc: field, included as part of an attachment, included in the body of the message, or provided through a separate channel.

In the example of FIG. 9, the flowchart 900 ends at module 910 with sending the message to the second message destination. Upon receipt of the message, a user can determine whether the alias was used by a first entity for which the alias was created, or by a second entity. The user may desire to take certain action following the determination, such as report one or both of the entities, filter messages from the second entity, attempt to unregister from the first entity, or the like.

Figure 10:
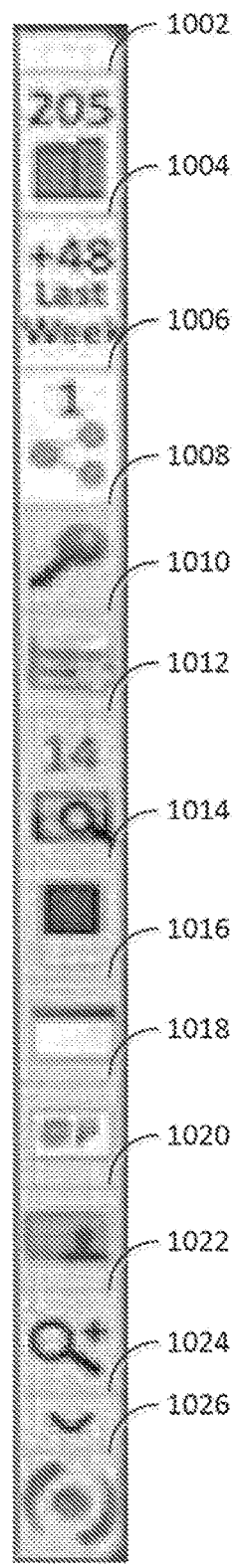
FIG. 10 depicts a diagram of an example of a controlled data management bar.

FIG. 10 depicts a diagram of an example of a controlled data management bar 1000. The controlled data management bar includes multiple information icons 1002 to 1024. In this example, the icons can generally be divided into a few categories: icons 1002 to 1006 are general information icons, icons 1008 to 1020 are contextual information icons, and icons 1022 to 1024 are other icons.

In the example of FIG. 10, icon 1002 is intended to represent a number of websites that have a user's data. In the example of FIG. 10, the number '205' that is depicted in the icon 1002 is intended to represent 205 websites have the user's data.

In the example of FIG. 10, icon 1004 is intended to represent a number of websites the user has given data to in the last week. In the example of FIG. 10, the number '+48' that is depicted in the icon 1004 is intended to represent 48 websites the user has given data to in the last week.

In the example of FIG. 10, icon 1006 is intended to represent a number of websites that have shared the user's data. In the example of FIG. 10, the number '1' that is depicted in the icon 1006 is intended to represent one website that has shared the user's data.

In the example of FIG. 10, icon 1008 is intended to represent a mechanism through which a user can get a password for a current website (i.e., a website the user is currently visiting). For example, the icon 1008 can be operational as a button if the user has an account on the current website and the user is on a page that accepts a password as input; and the icon 1008 can be unselectable (e.g., grey) if the user does not have an account on the current website or the user is not on a page of the website that accepts a password as input.

In the example of FIG. 10, the icon 1010 is intended to represent whether data left on the website is under the user's control (e.g., the icon can include a plus-sign as depicted in the example of FIG. 10 to indicate data left on the website is under the user's control). The icon 1010 can also indicate when data left on the website is not under the user's control.

In the example of FIG. 10, the icon 1012 is intended to indicate a number of trackers following and/or analyzing the user on the current website. In the example of FIG. 10, the number '14' that is depicted in the icon 1012 is intended to represent 14 trackers.

In the example of FIG. 10, the icon 1014 is intended to represent whether the current website has the user's mobile phone number. The icon 1014 can, for example, be greyed out when the current website has the user's mobile phone number and act as a button to provide the mobile phone number if the current website does not have the user's mobile phone number (or alternatively simply indicate whether the current website has the mobile phone number).

In the example of FIG. 10, the icon 1016 is intended to represent whether the current website has the user's credit or debit card information. The icon 1016 can, for example, be greyed out when the current website has credit or debit card information and act as a button to provide credit or debit card information if the current website does not have the user's credit or debit card information (or alternatively simply indicate whether the current website has the information).

In the example of FIG. 10, the icon 1018 is intended to represent whether email protection is active. The icon 1018 can, for example, be greyed out when email protection is active for the website and act as a button to switch from inactive email protection to active email protection (or alternatively simply indicate whether the current website is subject to active email protection). In a specific implementation, a third icon coloration (orange with red letters) is used to indicate the current website has shared email and potentially other data with external companies.

In the example of FIG. 10, the icon 1020 is intended to represent whether the user has an account or data on the current website. The icon 1020 can, for example, be greyed out when the user has an account or some data on the current website and act as a button to enable automatic or manual input of data (or alternatively simply indicate whether the current website has data or an account of the user).

In the example of FIG. 10, the icon 1022 is intended to represent a button to enable the user to search the user's personal data. In an alternative, the icon 1022 can be replaced with a text field that accepts entry of search terms.

In the example of FIG. 10, the icon 1024 is intended to represent a button that can be used to scroll to other icons.

In the example of FIG. 10, the icon 1026 is intended to represent a utility button that can be used for changing settings or some other function. In a specific implementation, the button can be used to indicate a purchase intention using secure email. To understand the value of this functionality, observe that when you wish to buy something via the Internet, you can use a search engine and either receive promotions/product offerings through email or go directly to a website to surf through the offerings, but when using a personal email address, you may continue to receive promotions and emails from websites and you can't stop the process; sometimes the only way is to delete your email account, which is not a satisfying solution. (Also, companies have collected personal identifiable information that in any case is a liability they have to carry.) A solution is to generate a one-shop email associated with a purchase intention with an expiration date: The user defines and manages the number of days he wants the email to be valid and accessible. In addition to that unique email, the user can decide to which companies this email can be provided. The email can be given to a restricted list of companies the user has selected within the companies he has in his data store or within a selected category (e.g., travel/consumer electronics, . . . ) or the user can select the list of companies belonging to the category travel of all users or indicate he has no restriction on receiving offers from companies. By doing that, the user can be guaranteed to be protected while getting offerings as well as when he has finalized his purchase; he simply deletes the temporary email and stops receiving ads and promotions. On the marketers side, this is a great opportunity to get a very qualified lead and be able to share it with partners and send offerings without limitation as in any case, the user can decide at any time to stop the process. Also, if the user wants to respond to one of those offers, he will be able to use a specific/standard email from which he can ask questions, and that is converted to the appropriate temporary email.

Another example of functionality with which the icon 1026 can be associated is declaring a purchase intention/signifying when the purchase is done. This aspect touches advertising based on behavioral targeting. Today, when you are surfing, all your behavior is tracked by third parties cookies placed on websites (we track them through our technology), in order to deliver you targeted ads, but when you have purchased the product, you often continue to receive ads related to what you were looking for, which is 100% wasted time; it is useless for the user, upsets him and the marketer is throwing money out of the window. Instead, the system can detect a purchase intention (from tracking what the user is filling on websites) and ask the user to confirm it through a button in the bar. So the user will have few purchase intentions opened and what we expect from him is to close them when he has finalized his purchase, whether online or offline. As soon as we have the information, we will send to the Ad networks a data structure that they can use to stop sending certain ads. This is real value for them as they won't waste money and won't bother the user.

Another example of functionality with which the icon 1026 can be associated is tagging search results/information in order to be able to come back quickly on it. When you are searching a product, it takes few days/weeks and in certain cases few months, and while you are browsing the websites discovering the different products, you would like to tag those that interest you and put that in one place under a specific label. In that case, a few days or a week after, you can access quickly those offers and make your decision. So a button in the bar (in this example, the icon 1026) will help consumer to tag a specific page and store the associated URL under a purchase intention name. The user can access all his purchase intentions at a time and as soon as the purchase is done, he deletes the intention.

Another example of functionality with which the icon 1026 can be associated is capturing ecommerce transactions. At the end of an ecommerce purchase, you have this last page that summarizes what you have acquired, the price, the credit card used, etc. A button in the bar (in this example, the icon 1026) can be pressed to snapshot the information associated with a website and store it in the user's personal data store. It will help user to analyze their purchase per vendor and keep a safe record of ecommerce transactions.

Some portions of the detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

An apparatus may be specially constructed to implement techniques described in this paper, or it may comprise a general purpose computer selectively activated or reconfigured by a computer program stored in the computer to produce a specially purposed machine. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the methods of some embodiments.

While aspects of the invention have been described by way of example in terms of certain embodiments, it will be appreciated by those skilled in the relevant art that certain modifications, permutations, and equivalents thereof are within the scope of the invention. It is therefore intended that the following appended claims include all such modifications, permutations and equivalents as fall within the true spirit and scope of the invention.

The invention claimed is:

1. A data management system comprising:
   at least one hardware processor; and
   memory storing program code, the program code being executable by the at least one hardware processor, wherein the program code is configured to cause the at least one hardware processor to:
   generate one or more interfaces configured to be presented to a user, wherein the one or more interfaces are configured to display a plurality of third parties that have access to personal data associated with the user;
   receive an update from the user, via the one or more interfaces, comprising one or more updates for at least a subset of the personal data associated with the user;
   identify at least a portion of the plurality of third parties to receive the one or more updates; and
   transmit a computer-readable instruction to the at least the portion of the plurality of third parties comprising the one or more updates.

2. The data management system of claim 1, wherein the program code is further configured to:
   enable, via the one or more interfaces, the user to grant access to at least a portion of the personal data to an additional third party;
   update a database associated with the data management system in response to the user granting access; and
   transmit a communication to the additional third party to enable access to the at least the portion of the personal data in response to the user granting access.

3. The data management system of claim 2, wherein the program code is further configured to cause display, via the one or more interfaces, of compensation that is associated with the granting of access to the at least the portion of the personal data to the additional third party.

4. The data management system of claim 1, wherein the program code is further configured to obtain at least a portion of the personal data associated with the user from at least one of the plurality of third parties.

5. The data management system of claim 1, wherein the program code is further configured to enable, via the one or more interfaces, the user to revoke the access to personal data associated with the user for at least one of the plurality of third parties.

6. The data management system of claim 1, wherein the personal data associated with the user comprises data indicative of at least one of behavioral data, name, address, email address, telephone number, credit card information, age, sex, occupation, and photos.

7. The data management system of claim 1, wherein the program code is further configured to:
   detect that one or more sharing third parties is providing personal data to one or more other third parties; and
   cause display, via the one or more interfaces, of at least a portion of a list of the one or more sharing third parties to the user.

8. The data management system of claim 7, wherein the program code detects that one or more sharing third parties is providing personal data to one or more other third parties based on historical data.

9. The data management system of claim 7, wherein the program code detects that the one or more sharing third parties is providing personal data to one or more other third parties by determining that each of the one or more sharing third parties has:
   (i) used aliased information that is associated with one or more users that was not previously provided to the sharing third party by the data management system; or
   (ii) shared aliased information that is associated with one or more users to one or more other third parties.

10. The data management system of claim 1, wherein the program code is further configured to cause display to the user, via the one or more interfaces, of a status indicating that at least one of the plurality of third parties requires non-aliased information.

11. The data management system of claim 1, wherein the program code is further configured to enable, via the one or more interfaces, the user to generate aliased information that is associated with (i) the user and (ii) at least one of the plurality of third parties.

12. The data management system of claim 1, wherein the program code is further configured to present a plurality of interfaces to a plurality of users,
wherein the plurality of interfaces include the one or more interfaces and the plurality of users includes the user.

13. A method for updating personal data, the method comprising:
generating one or more interfaces configured to be presented to a user, wherein the one or more interfaces are configured to display plurality of third parties that have access to personal data associated with the user;
receiving an update from the user, via the one or more interfaces, comprising one or more updates for at least a subset of the personal data associated with the user;
identifying at least a portion of the plurality of third parties to receive the one or more updates; and
transmitting a computer-readable instruction to the at least the portion of the plurality of third parties comprising the one or more updates.

14. The method of claim 13, further comprising enabling, via the one or more interfaces, the user to grant access to at least a portion of the personal data to an additional third party, wherein granting access comprises:
updating a database associated with a data management system; and
transmitting a communication to the additional third party to enable access to the at least the portion of the personal data.

15. The method of claim 14, further comprising enabling, via the one or more interfaces, the user to view compensation that is associated with the granting of access to the at least the portion of the personal data to the additional third party.

16. The method of claim 13, further comprising obtaining at least a portion of the personal data associated with the user from at least one of the plurality of third parties.

17. The method of claim 13, further comprising enabling, via the one or more interfaces, the user to revoke the access to personal data associated with the user for at least one of the plurality of third parties.

18. The method of claim 13, further comprising:
detecting that one or more sharing third parties is providing personal data to one or more other third parties; and
enabling, via the one or more interfaces, the user to view at least a portion of a list of the one or more sharing third parties.

19. The method of claim 18, wherein detecting that the one or more sharing third parties is providing personal data to one or more other third parties comprises determining that each of the one or more sharing third parties has:
(i) used aliased information that is associated with one or more users that was not previously provided to the sharing third party by a data management system; or
(ii) shared aliased information that is associated with one or more users to one or more other third parties.

20. The method of claim 13, further comprising enabling, via the one or more interfaces, the user to generate aliased information that is associated with (i) the user and (ii) at least one of the plurality of third parties.

* * * * *